(12) United States Patent
Boortz

(10) Patent No.: US 9,380,269 B2
(45) Date of Patent: Jun. 28, 2016

(54) SCHEDULING TRIGGER APPARATUS AND METHOD

(75) Inventor: Jeffery Allen Boortz, Narberth, PA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 2249 days.

(21) Appl. No.: 10/948,271

(22) Filed: Sep. 22, 2004

(65) Prior Publication Data

US 2005/0144635 A1 Jun. 30, 2005

Related U.S. Application Data

(60) Provisional application No. 60/505,274, filed on Sep. 23, 2003.

(51) Int. Cl.
| | |
|---|---|
| *G06F 3/00* | (2006.01) |
| *G06F 13/00* | (2006.01) |
| *H04N 5/445* | (2011.01) |
| *H04N 7/173* | (2011.01) |
| *H04N 21/2347* | (2011.01) |
| *H04N 21/2389* | (2011.01) |
| *H04N 21/262* | (2011.01) |

(Continued)

(52) U.S. Cl.
CPC ....... *H04N 7/17327* (2013.01); *H04N 5/44543* (2013.01); *H04N 21/2347* (2013.01); *H04N 21/23892* (2013.01); *H04N 21/262* (2013.01); *H04N 21/26258* (2013.01); *H04N 21/4353* (2013.01); *H04N 21/44016* (2013.01); *H04N 21/4722* (2013.01); *H04N 21/47202* (2013.01); *H04N 21/47214* (2013.01); *H04N 21/4825* (2013.01); *H04N 21/63345* (2013.01); *H04N 21/812* (2013.01); *H04N 21/8106* (2013.01)

(58) Field of Classification Search
USPC .................................. 725/32, 37, 100, 58, 14
See application file for complete search history.

(56) References Cited

U.S. PATENT DOCUMENTS

| | | | |
|---|---|---|---|
| 4,905,080 | A | 2/1990 | Watanabe et al. |
| 5,373,315 | A | 12/1994 | Dufresne et al. |

(Continued)

OTHER PUBLICATIONS

Open Cable Specification entitled "Enhanced TV Binary Interchange Format 1 0" OC-SP-ETV-131F1.0-106-110128 dated Jan. 28, 2011, 408 pages.

(Continued)

*Primary Examiner* — Kunal Langhnoja
(74) *Attorney, Agent, or Firm* — Gazdzinski & Associates, PC

(57) ABSTRACT

Apparatus and methods for embedding and associating triggers within a promotion or other similar content element with the event being promoted are disclosed. In one exemplary embodiment, consumer premises equipment (CPE) such as a digital set-top box is used to interface between the user and an external network (such as an HFC cable network) and facilitate the user selecting and scheduling viewing or recording of a subsequent event (e.g., broadcast movie) via the promotion itself. The trigger(s) within the promotion allow the user to contemporaneously select the promoted event for viewing, recording, etc. without any further action. The trigger(s) then initiates tuning of the user's receiver to the scheduled event at the appropriate date and time. This approach obviates additional actions by the user (such as programming their DVR), and also permits the user to commit to viewing the event when their interest level is highest; i.e., contemporaneous with the promotion.

13 Claims, 23 Drawing Sheets

(51) Int. Cl.
*H04N 21/435* (2011.01)
*H04N 21/44* (2011.01)
*H04N 21/472* (2011.01)
*H04N 21/4722* (2011.01)
*H04N 21/482* (2011.01)
*H04N 21/6334* (2011.01)
*H04N 21/81* (2011.01)

(56) References Cited

U.S. PATENT DOCUMENTS

| | | | |
|---|---|---|---|
| 5,481,294 | A | 1/1996 | Thomas et al. |
| 5,497,185 | A | 3/1996 | Dufresne et al. |
| 5,675,647 | A | 10/1997 | Garneau et al. |
| 5,793,409 | A | 8/1998 | Tetsumura |
| 5,812,642 | A | 9/1998 | LeRoy |
| 5,974,299 | A | 10/1999 | Massetti |
| 6,029,045 | A | 2/2000 | Picco et al. |
| 6,088,722 | A | 7/2000 | Herz et al. |
| 6,177,931 | B1 * | 1/2001 | Alexander et al. ............. 725/52 |
| 6,202,210 | B1 | 3/2001 | Ludtke |
| 6,396,055 | B1 | 5/2002 | Biedendorf |
| 6,463,585 | B1 | 10/2002 | Hendricks et al. |
| 6,467,089 | B1 | 10/2002 | Aust et al. |
| 6,549,718 | B1 * | 4/2003 | Grooters et al. ............... 386/83 |
| 6,647,548 | B1 | 11/2003 | Lu et al. |
| 6,681,393 | B1 | 1/2004 | Bauminger et al. |
| 6,687,735 | B1 | 2/2004 | Logston et al. |
| 6,704,930 | B1 | 3/2004 | Eldering et al. |
| 6,725,461 | B1 | 4/2004 | Dougherty et al. |
| 6,813,776 | B2 | 11/2004 | Chernock et al. |
| 6,859,845 | B2 | 2/2005 | Mate |
| 6,898,762 | B2 * | 5/2005 | Ellis et al. ..................... 715/716 |
| 6,915,528 | B1 | 7/2005 | McKenna, Jr. |
| 6,990,680 | B1 | 1/2006 | Wugofski |
| 7,017,179 | B1 | 3/2006 | Asamoto et al. |
| 7,039,928 | B2 | 5/2006 | Kamada et al. |
| 7,109,848 | B2 | 9/2006 | Schybergson |
| 7,174,126 | B2 | 2/2007 | McElhatten et al. |
| 7,197,472 | B2 | 3/2007 | Conkwright et al. |
| 7,222,078 | B2 | 5/2007 | Abelow |
| 7,266,836 | B2 | 9/2007 | Anttila |
| 7,281,261 | B2 | 10/2007 | Jaff et al. |
| 7,356,751 | B1 | 4/2008 | Levitan |
| 7,363,643 | B2 | 4/2008 | Drake et al. |
| 7,367,043 | B2 | 4/2008 | Dudkiewicz et al. |
| 7,369,750 | B2 * | 5/2008 | Cheng et al. .................... 386/83 |
| 7,457,520 | B2 | 11/2008 | Rossetti et al. |
| 7,602,820 | B2 | 10/2009 | Helms et al. |
| 7,603,529 | B1 | 10/2009 | MacHardy et al. |
| 7,712,125 | B2 | 5/2010 | Herigstad et al. |
| 7,720,432 | B1 | 5/2010 | Colby et al. |
| 7,730,509 | B2 | 6/2010 | Boulet et al. |
| 7,900,229 | B2 | 3/2011 | Dureau |
| 8,028,322 | B2 | 9/2011 | Riedl et al. |
| 8,042,131 | B2 | 10/2011 | Flickinger |
| 8,065,703 | B2 | 11/2011 | Wilson et al. |
| 8,205,226 | B2 | 6/2012 | Ko et al. |
| 8,214,256 | B2 | 7/2012 | Riedl et al. |
| 8,347,341 | B2 | 1/2013 | Markley et al. |
| 8,396,055 | B2 | 3/2013 | Patel et al. |
| 8,561,113 | B2 | 10/2013 | Cansler, Jr. et al. |
| 2001/0001160 | A1 | 5/2001 | Shoff et al. |
| 2002/0026496 | A1 * | 2/2002 | Boyer et al. .................... 709/218 |
| 2002/0032754 | A1 | 3/2002 | Logston et al. |
| 2002/0069404 | A1 | 6/2002 | Copeman et al. |
| 2002/0073419 | A1 | 6/2002 | Yen et al. |
| 2002/0078441 | A1 | 6/2002 | Drake et al. |
| 2002/0078444 | A1 | 6/2002 | Krewin et al. |
| 2002/0087975 | A1 | 7/2002 | Schlack |
| 2002/0087976 | A1 | 7/2002 | Kaplan et al. |
| 2002/0100063 | A1 | 7/2002 | Herigstad et al. |
| 2002/0123928 | A1 | 9/2002 | Eldering et al. |
| 2002/0147984 | A1 | 10/2002 | Tomsen et al. |
| 2002/0174430 | A1 | 11/2002 | Ellis et al. |
| 2002/0178445 | A1 | 11/2002 | Eldering et al. |
| 2002/0184629 | A1 * | 12/2002 | Sie et al. ......................... 725/41 |
| 2002/0184634 | A1 | 12/2002 | Cooper |
| 2002/0184635 | A1 * | 12/2002 | Istvan ............................ 725/51 |
| 2003/0005446 | A1 | 1/2003 | Jaff et al. |
| 2003/0018977 | A1 | 1/2003 | McKenna |
| 2003/0020744 | A1 | 1/2003 | Ellis et al. |
| 2003/0030751 | A1 | 2/2003 | Lupulescu et al. |
| 2003/0056217 | A1 | 3/2003 | Brooks |
| 2003/0093790 | A1 | 5/2003 | Logan et al. |
| 2003/0101454 | A1 | 5/2003 | Ozer et al. |
| 2003/0110503 | A1 | 6/2003 | Perkes |
| 2003/0115601 | A1 * | 6/2003 | Palazzo et al. ................. 725/42 |
| 2003/0135513 | A1 | 7/2003 | Quinn et al. |
| 2003/0149990 | A1 | 8/2003 | Anttila et al. |
| 2003/0149993 | A1 | 8/2003 | Son et al. |
| 2003/0237090 | A1 | 12/2003 | Boston et al. |
| 2004/0034873 | A1 | 2/2004 | Zenoni |
| 2004/0047599 | A1 | 3/2004 | Grzeczkowski |
| 2004/0060076 | A1 | 3/2004 | Song |
| 2004/0073915 | A1 | 4/2004 | Dureau |
| 2004/0117817 | A1 | 6/2004 | Kwon et al. |
| 2004/0133467 | A1 | 7/2004 | Siler |
| 2004/0148625 | A1 | 7/2004 | Eldering et al. |
| 2004/0163111 | A1 | 8/2004 | Palazzo et al. |
| 2004/0177383 | A1 | 9/2004 | Martinolich et al. |
| 2004/0181811 | A1 * | 9/2004 | Rakib ............................ 725/122 |
| 2005/0022237 | A1 | 1/2005 | Nomura |
| 2005/0027696 | A1 | 2/2005 | Swaminathan et al. |
| 2005/0028208 | A1 | 2/2005 | Ellis et al. |
| 2005/0034171 | A1 | 2/2005 | Benya |
| 2005/0034173 | A1 | 2/2005 | Hatanaka |
| 2005/0039205 | A1 | 2/2005 | Riedl |
| 2005/0060745 | A1 | 3/2005 | Riedl et al. |
| 2005/0105396 | A1 | 5/2005 | Schybergson |
| 2005/0210502 | A1 | 9/2005 | Flickinger et al. |
| 2005/0229209 | A1 | 10/2005 | Hildebolt et al. |
| 2005/0235318 | A1 * | 10/2005 | Grauch et al. ................. 725/46 |
| 2005/0262542 | A1 | 11/2005 | DeWeese et al. |
| 2005/0273819 | A1 | 12/2005 | Knudson et al. |
| 2005/0289588 | A1 | 12/2005 | Kinnear |
| 2006/0019702 | A1 | 1/2006 | Anttila et al. |
| 2006/0031883 | A1 | 2/2006 | Ellis et al. |
| 2006/0080408 | A1 | 4/2006 | Istvan et al. |
| 2006/0117341 | A1 | 6/2006 | Park |
| 2006/0190336 | A1 | 8/2006 | Pisaris-Henderson et al. |
| 2006/0253584 | A1 | 11/2006 | Dixon et al. |
| 2006/0259924 | A1 | 11/2006 | Boortz et al. |
| 2006/0294259 | A1 | 12/2006 | Matefi et al. |
| 2007/0022459 | A1 | 1/2007 | Gaebel et al. |
| 2007/0115389 | A1 | 5/2007 | McCarthy et al. |
| 2007/0217436 | A1 | 9/2007 | Markley et al. |
| 2007/0244760 | A1 | 10/2007 | Bodnar et al. |
| 2008/0115169 | A1 | 5/2008 | Ellis et al. |
| 2008/0147497 | A1 | 6/2008 | Tischer |
| 2008/0163305 | A1 | 7/2008 | Johnson et al. |
| 2008/0263578 | A1 | 10/2008 | Bayer et al. |
| 2008/0313671 | A1 | 12/2008 | Batrouny et al. |
| 2008/0313691 | A1 | 12/2008 | Cholas et al. |
| 2009/0030802 | A1 | 1/2009 | Plotnick et al. |
| 2009/0132346 | A1 | 5/2009 | Duggal et al. |
| 2009/0187939 | A1 | 7/2009 | Lajoie |
| 2009/0210899 | A1 | 8/2009 | Lawrence-Apfelbaum et al. |
| 2009/0319379 | A1 | 12/2009 | Joao |
| 2009/0320059 | A1 | 12/2009 | Bolyukh |
| 2010/0175084 | A1 | 7/2010 | Ellis et al. |
| 2010/0251304 | A1 | 9/2010 | Donoghue et al. |
| 2010/0251305 | A1 | 9/2010 | Kimble et al. |
| 2011/0015989 | A1 | 1/2011 | Tidwell et al. |
| 2011/0016479 | A1 | 1/2011 | Tidwell et al. |
| 2011/0016482 | A1 | 1/2011 | Tidwell et al. |
| 2011/0103374 | A1 | 5/2011 | Lajoie et al. |

OTHER PUBLICATIONS

Tandberg Television specification entitled "AdPoint.RTM. Advanced Advertising Platform" dated Mar. 2008, 2 pages.

* cited by examiner

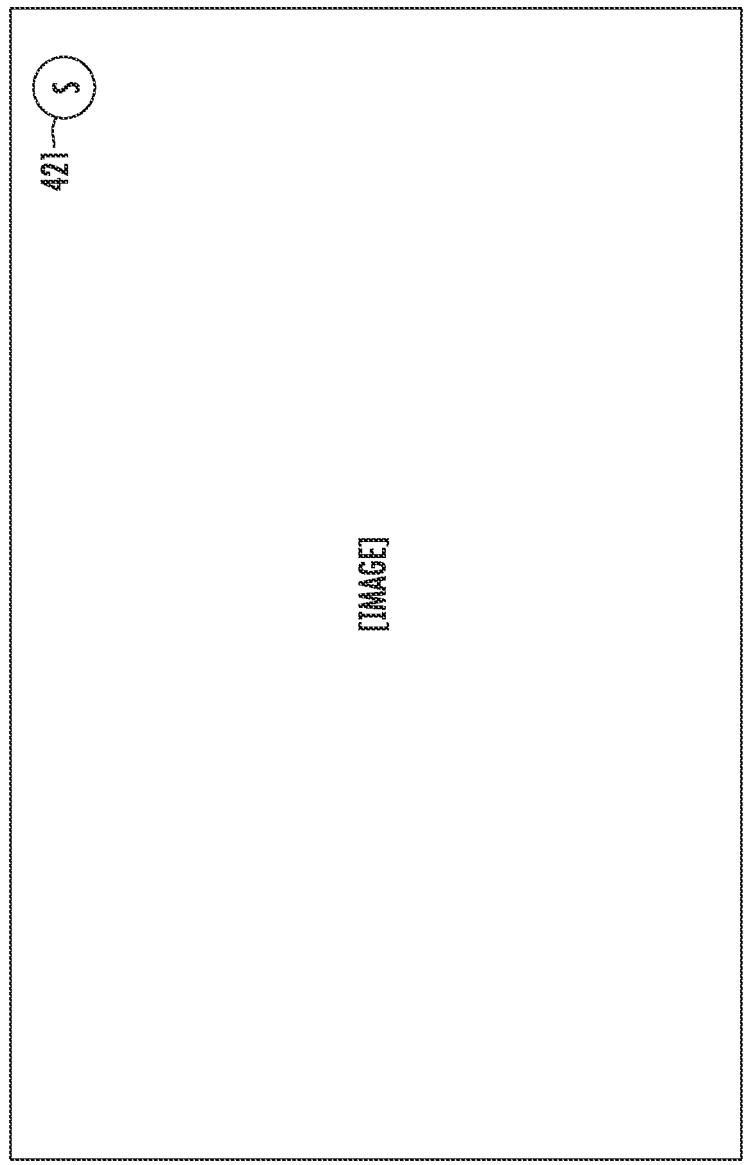

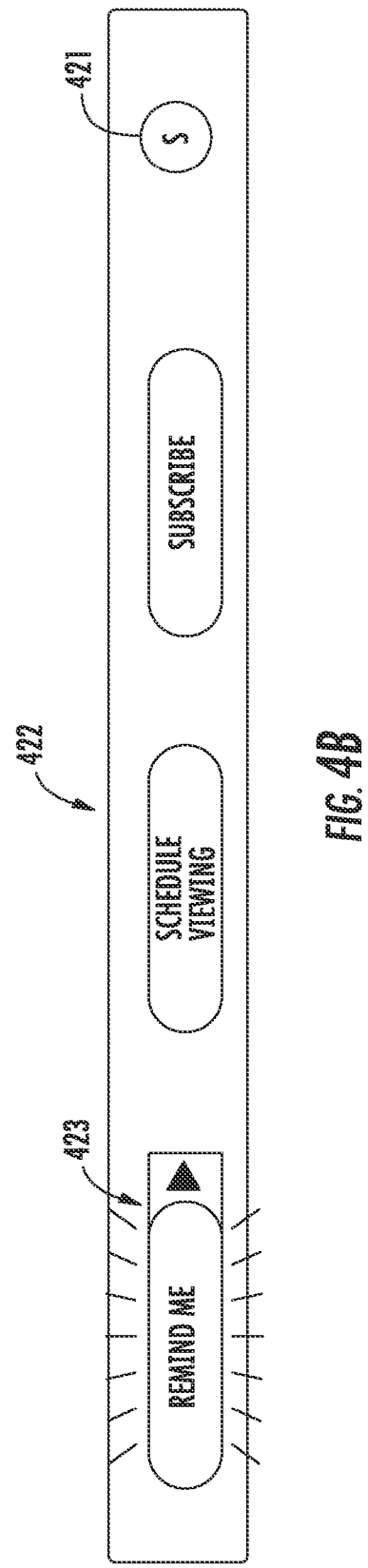

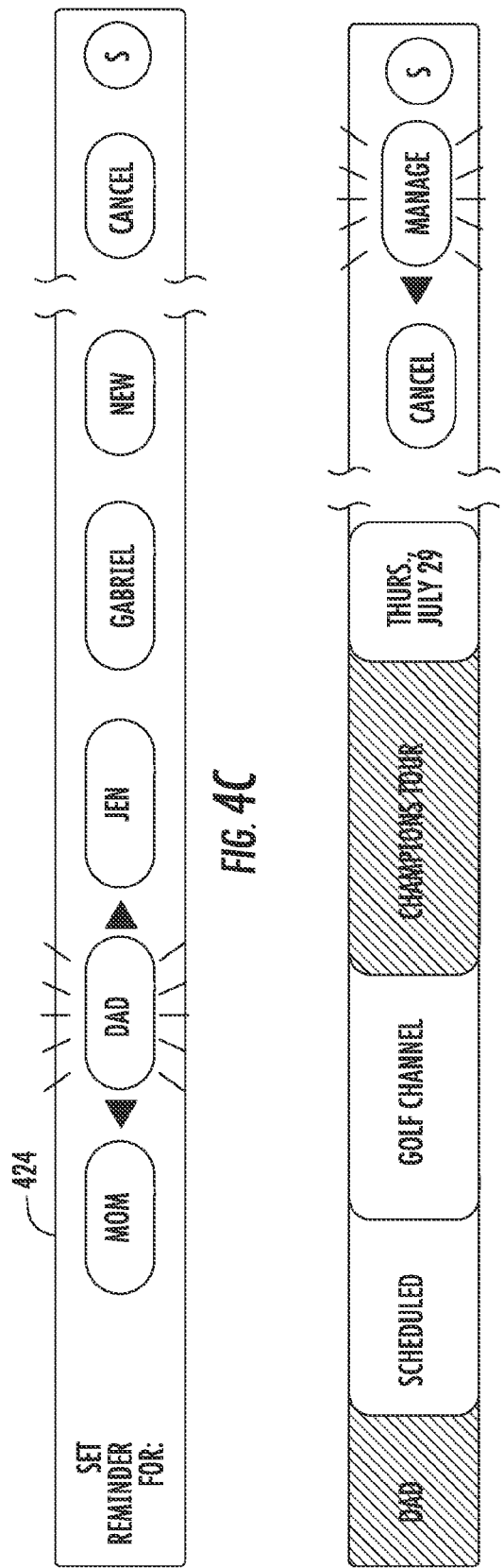

Friday July 29 12:23p personal viewing schedules

COMBINED | MOM | DAD | JEN | GABRIEL | TTY

Today

| Time | Channel | Program | | | |
|---|---|---|---|---|---|
| 12p-1 | CNN | LOU DOBBS MONEYLINE | INFO | CANCEL | AIRING |
| 3p-5:30 | GOLF | THE CHAMPIONS TOUR | INFO | CANCEL | SCHED |
| 6p-6:30 | CNBC | MARKETWATCH | INFO | CANCEL | REMIND |
| 8p-10:30 | HBO | TERMINATOR II | INFO | CANCEL | CONFLICT |

Tomorrow- July 30

| Time | Channel | Program | | | |
|---|---|---|---|---|---|
| 12p-1 | CNN | NEWSDAY | INFO | CANCEL | SUBSCR |
| 2p-4:30 | FOX | NFL- TAMPA VS. CHICAGO | INFO | CANCEL | SUBSCR |
| 6p-6:30 | ESPN | PRO BOWLING | INFO | CANCEL | SCHED |

*FIG. 4E*

SCHEDULING TRIGGER APPARATUS AND METHOD

PRIORITY

This application claims priority to U.S. Provisional Application Ser. No. 60/505,274 filed Sep. 23, 2003 entitled "EMBEDDED SCHEDULING TRIGGER", incorporated herein by reference in its entirety

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. FIELD OF THE INVENTION

The present invention relates to the field of content delivery and telecommunications, and specifically to improved apparatus and methods for providing and operating a content delivery environment such as, for example, in association with a digital television distributed over a cable or satellite network or some other means.

2. DESCRIPTION OF RELATED TECHNOLOGY

Various methods of delivering media content such as video to end users or consumers are known in the prior art. For example, when the consumer requests television services (such as from a cable, satellite, or terrestrial network service provider), the service provider generally installs a host or terminal device, such as a set-top box (STB), that has access to the media content, at the consumer's premises. The service provider (e.g., MSO) delivers the content over the various channels subscribed by a particular user, as determined by a network or other content source, such as for example delivering movies for Home Box Office (HBO) to paying subscribers via the cable network and STB. These services are provided for a fee, such as a monthly cable subscription fee.

So-called "pay-per-view" (PPV) systems allow the user to pay for movies or other content on an as-needed basis. While there may be a fee associated with maintaining the PPV capability, the bulk of the fees are charged for user-selected viewings of particular content items.

Similarly, "on-demand" (OD) systems allow the user to view a movie or other content without adhering to a specific schedule; i.e., when the viewer wants to watch the movie, and not only when it is broadcast or made available for download at the discretion of the MSO or network operator. On-demand functionality may also be coupled with PPV, such that the user is charged for each on-demand session as opposed to on a running subscription basis.

In order to increase subscriber awareness (and viewership) of the delivered content, networks will broadcast so-called "promotions" for these events. A promotion might comprise, e.g., a short clip or compilation of scenes from the event, constructed so as to pique viewer interest. These promotions are often frequently interspersed with the channel's other programming (such as during breaks between programs), and may be disposed within the programming schedule so as to occur at predetermined times where their efficacy is considered greatest. For example, a promotion might comprise a brief video trailer with associated audio content of a movie which has the same actors, or similar theme/genre, to that just viewed by the subscriber.

Alternatively, these promotions may comprise small animated or static graphics (and sometimes associated audio) disposed in a visible but largely non-intrusive region of the viewer's display, which briefly promote a given event or series of events. As a simple example, a small iconic basketball may briefly dribble across the lower portion of the viewer's display region, followed by the words "NBA Finals on XYZ TV July 25 at 8:00 pm EST" or the like.

As implied above, another particular function of these promotions is to alert the user as to the date and time that the event would be aired or otherwise be made accessible. Under the prior art, a viewer of such promotional broadcasts often must proceed through a series of complex steps to schedule a viewing of the promoted event. For example, the owner of a VCR or digital video recorder (DVR) typically has to program the recording device to record the promoted event at the specified date and time, and to then play the recording back later. Simplified control for accomplishing such programming has made great strides in recent years; however, the user is still required to affirmatively program the device, which may or may not be on line at that given point in time.

Similarly, a satellite or cable viewer has to access a menu or electronic program guide (EPG), locate the promoted event on the menu, and set the system to play, record or remind the viewer of the event when it occurs.

In addition to the complexity and extra effort required to effectuate such activities, there is often a significant decline in a given user's motivation to watch or record the event where such extra steps are required. Hence, if the promoted event is something that the prospective viewer is only marginally interested in ("don't care"), they may be dissuaded from viewing or recording the event if it requires too much effort.

In a related fashion, even the more motivated viewer may simply forget to program their recording device or tuner/receiver, such as where they get distracted by another subsequent promotion. Or, alternatively, their motivation may wane as a function of time after the promotion, thereby making them less likely to view or record the event as time goes on.

Additionally, with the vast number of channels now available in content-based networks such as cable and satellite, it is often difficult for the viewer to remember on which network a given show is appearing. Moreover, some shows or events now air on multiple networks at different days/times, making this proposition even more difficult.

Another deficiency of prior art approaches to promotion and scheduling relates to "cross-media" promotion. Specifically, it may be desirable to air or deliver promotions to prospective viewers over one medium that relate to an event occurring within another medium. For example, a viewer may rent or purchase a DVD (or otherwise download the content, such as via an Internet P2P file-sharing or download venue) that replays the 2004 NBA finals. This DVD or download might contain a promotion for the 2005 NBA finals broadcast live on cable channel XYZ TV. Unless the viewer is provided a mechanism to schedule their viewing of the 2005 event(s) at the time they view the promotion provided with the 2004 DVD or download, they are less likely to view the event (or at least to commit to doing so any time in the near future).

In light of the foregoing, an improved apparatus and method for scheduling various activities (such as tuning, viewing, and/or recording) relating to delivered content is needed. Such improved apparatus and methods would ideally both (i) relieve the viewer from having to take burdensome additional actions (such as programming their DVR or EPG) to schedule these activities, and (ii) allow for contemporaneous scheduling of these activities with promotional events, when viewer motivation and opportunity is peaked.

SUMMARY OF THE INVENTION

The present invention satisfies the aforementioned needs by providing improved methods and apparatus for, inter alia, associating content with one or more promotions delivered e.g., over a network.

In a first aspect of the invention, an improved method of associating one or more content elements with a trigger element in a network is disclosed. In one embodiment, the network comprises a content-based (e.g., cable) network, and the method comprises: providing at least one content element adapted for transfer to a user over the information network to the user's consumer premises equipment (CPE); providing at least one promotion, the at least one promotion being directly or indirectly related to the at least one content element; and associating at least one trigger element with the at least one promotion; the at least one trigger element being adapted to trigger the CPE to take a specified action relating to the content element. The content element may comprise, e.g., video and audio content, as may the promotion.

In a second aspect of the invention, a method of scheduling viewing of a subsequently transmitted event via a content-based network having at least one user CPE is disclosed. In one embodiment, the method comprises: providing at least one network entity having a first software process operative to run thereon; providing an application operative to run on the CPE and communicate with the first software process; delivering promotional content to the CPE, the content further comprising embedded/associated data relating thereto; accessing at least a portion of the embedded/associated data using the CPE; utilizing the application to transmit at least portions of the data to the at least one network entity; and utilizing the transmitted data at a subsequent time to cause the CPE to tune to the event.

In a third aspect of the invention, a method of transmitting promotional content over a network having at least one user CPE is disclosed. In one embodiment, the method comprises: providing a first network entity adapted to transmit the promotional content to the CPE; providing a second network entity having a first software process operative to run thereon; providing an application operative to run on the CPE and communicate with the first software process; delivering first promotional content to the CPE from the first entity, the first content further comprising embedded/associated data relating thereto; accessing at least a portion of the embedded/associated data using the CPE; utilizing the application to transmit at least portions of the data to the second network entity; providing information based at least in part on the portions of the transmitted data to the first network entity; and selectively transmitting subsequent promotional content based at least in part on the information.

In a fourth aspect of the invention, CPE adapted for use in a network is disclosed. In one embodiment, the CPE comprises: a receiver adapted to receive promotional content from a plurality of channels of the network; an application adapted to receive data relating to one or more scheduled events delivered over the channels, the data being associated with the promotional content; and a user interface adapted to allow a user of the CPE to select the one or more scheduled events for subsequent viewing; wherein the data and the application cooperate to cause the CPE receiver to tune to appropriate channels based on the user's selections.

In a fifth aspect of the invention, a metadata computer file structure for use in a content-based network is disclosed. In one embodiment, the structure is adapted to provide embedded/associated triggering for an event, and comprises: first metadata providing the date of the event; second metadata providing the start time of the event, and third metadata providing the channel of the event. Fourth metadata providing information relating to the decryption of any one of the first, second or third metadata is also optionally provided. The metadata is also optionally human readable.

In a sixth aspect of the invention, a scheduling trigger application comprising a computer program operative to run on CPE in a network is disclosed. In one embodiment, the network comprises a cable network, and the application is adapted to receive promotion-related content and metadata associated therewith from the head-end, the metadata comprising a representation of information relating to an event promoted in the promotion-related content, the application allowing for the selection of the event by a user for subsequent viewing, the selection being contemporaneous with viewing the promotion-related content.

In a seventh aspect of the invention, an improved method of scheduling events in a content-based network is disclosed. In one embodiment, the method comprises: providing a user with CPE adapted to: (i) permit the viewing of promotions related to the at least one event, and (ii) allow the user to contemporaneously select the at least one event for subsequent viewing or recording; wherein the selection of the at least one event is accomplished by: (i) providing user interface (UI) elements substantially integrated with the promotions; and (ii) providing data associated with the promotions relating to the date and channel of the selected event.

In an eighth aspect of the invention, a method of conducting business in a cable network environment is disclosed. In one embodiment, promotions for events are distributed over the network to a plurality of users having CPE, and the method comprises associating, for a fee or other consideration, at least one trigger element with at least one of the promotions, the at least one trigger element being adapted to trigger the CPE to take a specified action relating to the event.

In a ninth aspect of the disclosure, a method of associating one or more content elements with a trigger element is disclosed. In one embodiment, the method includes: (i) enabling a user to configure one or more aspects of a user-selectable trigger element disposed within a promotion, the promotion being directly or indirectly related to at least one content element; (ii) delivering the promotion to a user device; (iii) transmitting an activation signal to the user device; (iv) transmitting a deactivation signal to the user device; (v) within a time period between the transmission of the activation signal and the transmission of the deactivation signal, receiving from the user device a selection of the trigger element; and (vi) causing the trigger element to be stored at a remote entity in communication with the user device.

In one variant, the user-selectable trigger element within the promotion may be implemented according to the one or more aspects, and may be further implemented to cause the user device to take a specified action relating to the content element when selected.

In another variant, the activation signal may cause the user-selectable trigger element to be made available for selection by the user, and the deactivation signal may cause the user-selectable trigger element to be made unavailable for selection by the user.

In yet another variant, the remote entity utilizing the stored trigger element to cause the user device to perform the specified action.

These and other aspects of the invention will be readily appreciated by those of ordinary skill provided the present disclosure.

BRIEF DESCRIPTION OF THE DRAWINGS

FIGS. 4a-4j are graphical representations of exemplary screen displays embodying various aspects of the present invention.

FIGS. 4k-4p are graphical representations of an alternate embodiment of the user interface of the invention (without reminder functionality).

DETAILED DESCRIPTION OF THE INVENTION

Figure 1:
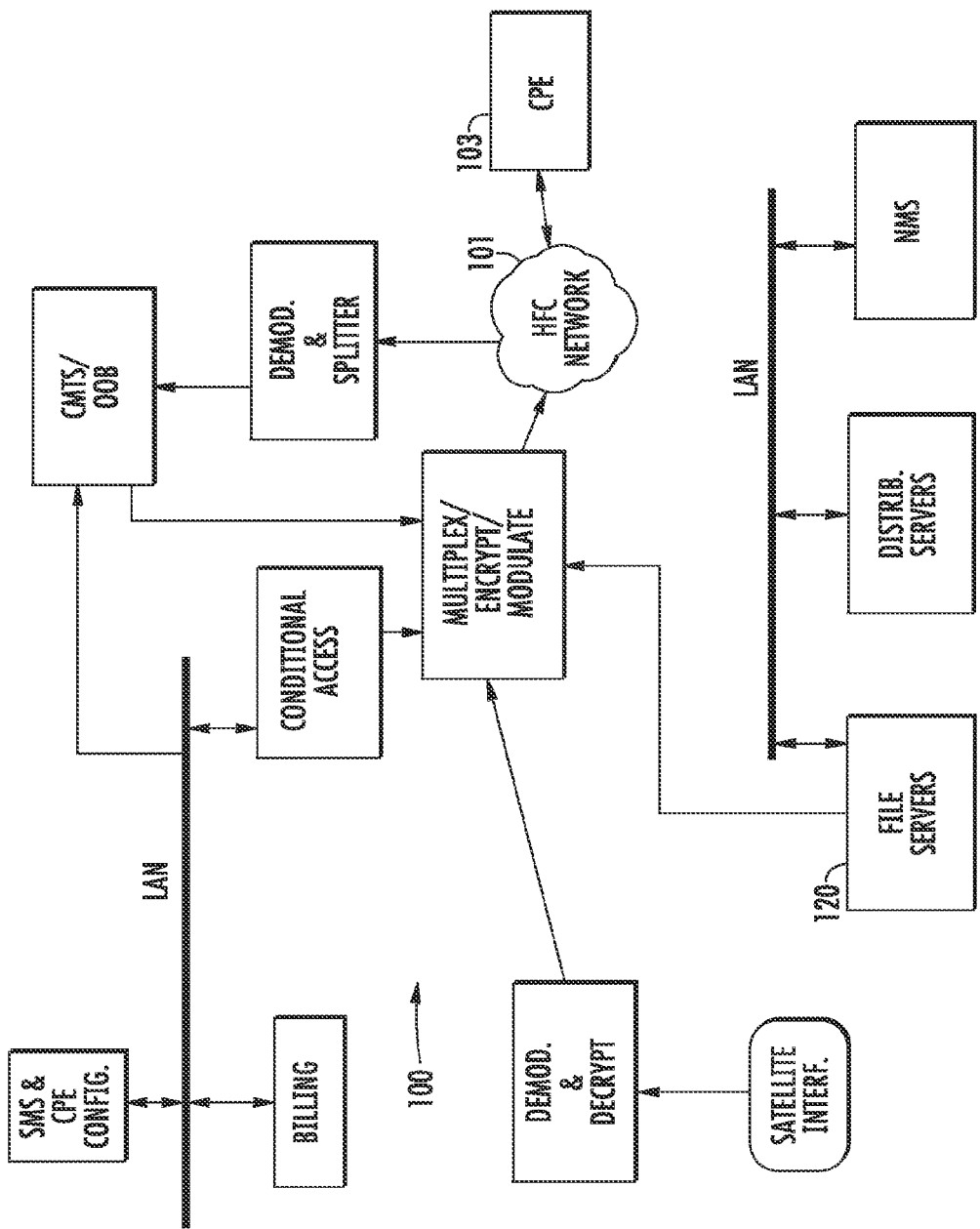
FIG. 1 is a graphical representation of an exemplary embedded scheduling trigger services network architecture according to the invention.

Reference is now made to the drawings wherein like numerals refer to like parts throughout.

As used herein, the terms "client device", "end user device" and "Consumer Premises Equipment (CPE)" include, but are not limited to, personal computers (PCs) and minicomputers, whether desktop, laptop, or otherwise, digital set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers, personal communicators such as the Motorola Accompli devices, J2ME equipped devices, cellular telephones, or literally any other device capable of interchanging data with a network.

Similarly, the term "host device" refers to any type of electronic equipment located within a consumer's or user's premises and connected to or communicating with, either directly or indirectly, a network.

As used herein, the term "application" refers generally to a unit of executable software that implements theme-based functionality. The themes of applications vary broadly across any number of disciplines and functions (such as promotions, e-commerce transactions, brokerage transactions, home entertainment, interactive TV, gaming, e-commerce, e-mail, chat, instant messaging, home shopping, etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML), and the like, as well as object-oriented environments such as the Common Object Request Broker Architecture (CORBA), Java™ (including J2ME, Java Beans, etc.) and the like.

As used herein, the term "head-end" refers generally to a networked system controlled by, e.g., a multiple systems operator (MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their digital Set-top box (DSTB) from the MSO exclusively. Accordingly, it is anticipated that MSO networks may have client devices from multiple vendors, and these client devices will have widely varying hardware capabilities.

As used herein, the term "DOCSIS" refers to any of the existing or planned variants of the Data Over Cable Services Interface Specification, including for example DOCSIS versions 1.0, 1.1 and 2.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), Reconfigurable Compute Fabrics (RCFs), ASICs, and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

As used herein, the term "event" refers to any one or more occurrences that correspond to one or more other coordinates. These coordinates may be absolute or relative in nature as well. For example, a coordinate might comprise a given time of day (e.g., 0500:00:00 GMT), or alternatively may be the occurrence of a precursor event (e.g., the completion of a certain program or generation of a signal). The coordinates need not be predetermined either, such as for example where the "event" comprises achieving a certain criterion or condition (e.g., viewership of a given program reaches a certain threshold level). In the context of broadcast or delivered media, for example, an event may comprise a movie, a play, a sporting event, a show, a news broadcast, PPV event, an instructional video, or any other type of programming material.

As used herein, the term "promotion" refers generally to any type of activity which sponsors, advertises, or otherwise promotes one or more events. Promotions may be, without limitation, broadcast for contemporaneous viewing by one or more users, stored for situational or anecdotal call-up, or even created in real time or near-real time. Promotions may be, e.g., visual and/or audible in nature, or may even appeal to one or more other senses of the viewers.

As used herein, the term "user interface" refers to any type of mechanism or means by which one or more users may interface with a component or software application including, without limitation, GUIs (e.g., visible menus, icons, etc.), auditory UIs (e.g., speech recognition, TTS, etc.), and manual UIs (e.g., tactile equipment such as FFKs, touch screens, buttons, Braille interfaces, etc.). Other interfaces, such as those sensing a biophysical parameter of the user (e.g., retinal position or electropotential) are also contemplated to fall within this term.

Overview—

The present invention is generally directed to methods and apparatus for associating a scheduling "trigger" or other artifact with a promotion of an event to be broadcast or made available in the future. This trigger or artifact invokes a desired response, such as tuning to a prescribed channel or causing recording to start, within the viewer's CATV receiver (e.g., DSTB) coincident with or related to the promoted event. Advantageously, the present invention allows the user to readily schedule an event for viewing, recording, etc. without having to program recorders or navigate difficult-to-use menu structures or program guides. The embedded or associated triggers (E/ATs) within the promotion allow the viewer to control their viewing or recording of the promoted event without having to take further actions. This approach also allows the viewer to schedule viewing of the event when their interest is highest; i.e., at the time of the promotion. Stated differently, the more work that the viewer must perform to view the promoted event, the less likely they are to view or record the event. Similarly, the greater the elapsed time between the promoted event and the event itself, the less likely the viewer is to remember the date and time of the event. The present invention avoids these two pitfalls by providing a solution which is both extremely simple to use, and which allows effectively instantaneous scheduling or commitment of the user to watch the promoted event.

Advantageously, the present invention can be readily implemented within existing or legacy hardware environments, such as within existing cable system set-top boxes. Download of the embedded/associated trigger application to (or other installation of software modifications of) these devices can be readily accomplished using existing infrastructure and no hardware changes.

In one embodiment, the apparatus of the invention embeds or associates one or more scheduling triggers within the promotional broadcast or content distribution. The trigger, when delivered and made cognizable to the end user, may be in any form including for example a visual form, audible form, tactical form, or a combination thereof. For example, the trigger user interface (UI) may comprise an icon or menu that is visually displayed during or coincident with the promotional broadcast or use of the distributed content. In one variant, the menu comprises a user-navigable visual menu disposed along, e.g., one edge of the viewers screen when the viewer is tuned to the promotional broadcast. The embedded/ associated trigger functionality can also be made user-configurable, such as where the user can customize the operation of the trigger for their own personal preferences.

In another variant, an audible prompt or promotion is played (e.g., a short audio clip describing the event and time, as well as instructions for selecting this event, or scheduling a reminder).

In another embodiment, the promotion comprises an electronic mail or other message, such as one containing a "Flash" multimedia module, that is sent to the CPE or another client device (such as a PC or handheld computer) that utilizes the local application environment to present the promotional material to the user.

A client portion of the embedded/associated trigger and scheduling application (e.g., Cable Select, described below) can also be used to provide cross-platform functionality, such as between a mobile wireless device and the user's CPE.

DESCRIPTION OF EXEMPLARY EMBODIMENTS

Exemplary embodiments of the apparatus and methods of the present invention are now described in detail. It is noted that while the exemplary embodiments of the invention are described herein primarily in terms of a consumer digital television (DTV) environment used with a hybrid fiber coax (HFC) cable bearer network such as that of FIG. 1 described subsequently herein, the apparatus and methods may be readily adapted to other types of network environments and media devices, the latter to include for example high definition television (HDTV) or even NTSC (analog) based systems.

Hence, the present invention is considered "content agnostic" in that the interactive functionality provided herein is generally not limited to one type of format of content or media delivery architecture. Internet or even peer-to-peer (P2P) architectures (as opposed to purely server-client architectures), including both those with a more centralized directory server, and those with a completely peer-to-peer functionality, may also be employed consistent with the invention with proper adaptation. For example, one peer may maintain a library of different videos or movies which may be made available according to a predetermined schedule; these "events" may be subject to embedded trigger associations within related promotions (whether on the same network or a different one) as described subsequently herein.

As used herein, the term "network" is meant to also include internets (such as the Internet), intranets, LANs, WANS, MANs, and the like, each of which may comprises one or more portions of the network either individually or collectively. Furthermore, the bearer network architecture or topology is in no way limited, and may include for example traditional network systems, FTTC/FTTH, satellite networks, millimeter wave systems, optical networks, and ATM, IEEE-802.3, X.25, 802.11, Token Ring, SONET, Frame Relay, 3G/GPRS, etc. topologies and various associated protocols such as TCP/IP, HTTP, FTP, WAP, RTP/RTCP, SIP, H.323, LDAP, IGMP, and the like. All such adaptations and alternate embodiments are readily implemented by those of ordinary skill in the relevant arts, and are considered to fall within the scope of the claims appended hereto.

It will also be appreciated that while described generally in the context of a consumer (i.e., home) end user domain, the present invention may be readily adapted to other types of environments (e.g., commercial/enterprise, government/ military, etc.) as well. Alternatively, such a system could be used to efficiently distribute (and associate) promotions and content across multiple users at a hotel, residential apartment/ condominium complex, governmental installation or national laboratory. For example, in one enterprise variant, "promotions" for an upcoming intra-company CATV broadcast by a Company CEO (whether delivered over the CATV network or another medium such as the Company's e-mail server) can include triggers by which the user can schedule to be reminded in advance and view the event when it is broadcast. Other applications are possible.

Furthermore, while aspects of the exemplary embodiment utilize an application referred to as "Cable Select", this term is purely for illustration, and but one possible embodiment. The invention is in no way limited to cable systems, or this particular embodiment of the application.

Network and Head-End Architecture—

Referring now to FIG. 1, one exemplary embodiment of the network and head-end architecture according to the invention is described. As shown in FIG. 1, the head-end architecture 100 comprises typical head-end components and services including billing module 102, subscriber management system (SMS) and CPE configuration management module 104, cable-modem termination system (CMTS) and OOB system 106, as well as LAN(s) 108, 110. The LANs allow the various components of the system to be in data communication with one another. It will be appreciated that while a bus LAN topology is illustrated, any number of other arrangements as previously referenced (e.g., ring, star, etc.) may be used consistent with the invention. It will also be appreciated that the head-end configuration depicted in FIG. 1 is high-level, conceptual architecture and that each MSO may have multiple head-ends deployed using one or more custom architectures.

In the typical HFC network, information is carried across multiple channels. Thus, the head-end must be adapted to acquire the information for the carried channels from various sources. Typically, the channels being delivered from the head-end 100 to the CPE 103 ("downstream") are multiplexed together in the head-end and sent to neighborhood hubs (not shown). Hence, the architecture 100 of FIG. 1 further includes a multiplexer, encrypter, and modulator (MEM) 112 coupled to the HFC network 101 adapted to "condition" content for transmission over the network.

In the present embodiment, the distribution servers 102 are coupled to the LAN 110, which provides access to the MEM 112 and network 101 via one or more file servers 120.

Audio and video are provided in each downstream (in-band) channel. To communicate with the head-end, the CPE 103 uses the out-of-band (OOB) or DOCSIS channels and associated protocols. The OCAP 1.0 specification provides for networking protocols both downstream and upstream. To distribute files and applications to the CPE 103, the exemplary embodiment is configured as data and object carousels and may be sent in both the in-band and OOB channels. Such carousels are well known in the cable arts, and comprise file directories containing files that are repetitively sent downstream using a protocol such as that provided by OCAP. These carousels may be disposed in any number of different configurations within the head-end or its associated entities, including for example the local/remote file servers 120 of FIG. 1. Other head-end mechanisms for file/application distribution may be used, however.

The promotion delivery system of the present invention advantageously provides the ability to deliver promotions from the network architecture 100, via the HFC network 101 to the CPE 103. Such delivery of the promotions to the CPE 103 can take the form of, e.g., "push" or "pull" transmissions. The push form is initiated by, e.g., the cable head (such as where the promotion is included with the content within the multiplexed transport stream), while the pull form is indirectly initiated by the CPE 103, such as when an OD or PPV session is pulled by the CPE using an upstream communication. These CPE pulls can also be selectively utilized, such as where only a pull of a certain genre of content (e.g., reality movie) will initiate a certain type of promotion, the latter being targeted or coupled in some logical fashion to the pulled content.

A third party push or pull can be initiated by another network entity which is neither the server (head-end) or CPE, such as an Internet website, authorization entity, etc. For example, a consumer may sign up for a service to receive, e.g., promotions or even content automatically upon the occurrence of an event such as a new video release (push), at periodic or variable intervals (e.g., "new releases this month"), or even responsive to a structured or unstructured user query (pull). The delivery service may be free, pay subscription based (including PPV), or otherwise.

Hence, it will be appreciated that the present invention is in no way limited to the more traditional "broadcast" of promotions at predetermined dates and times.

Exemplary CPE—

Figure 2:
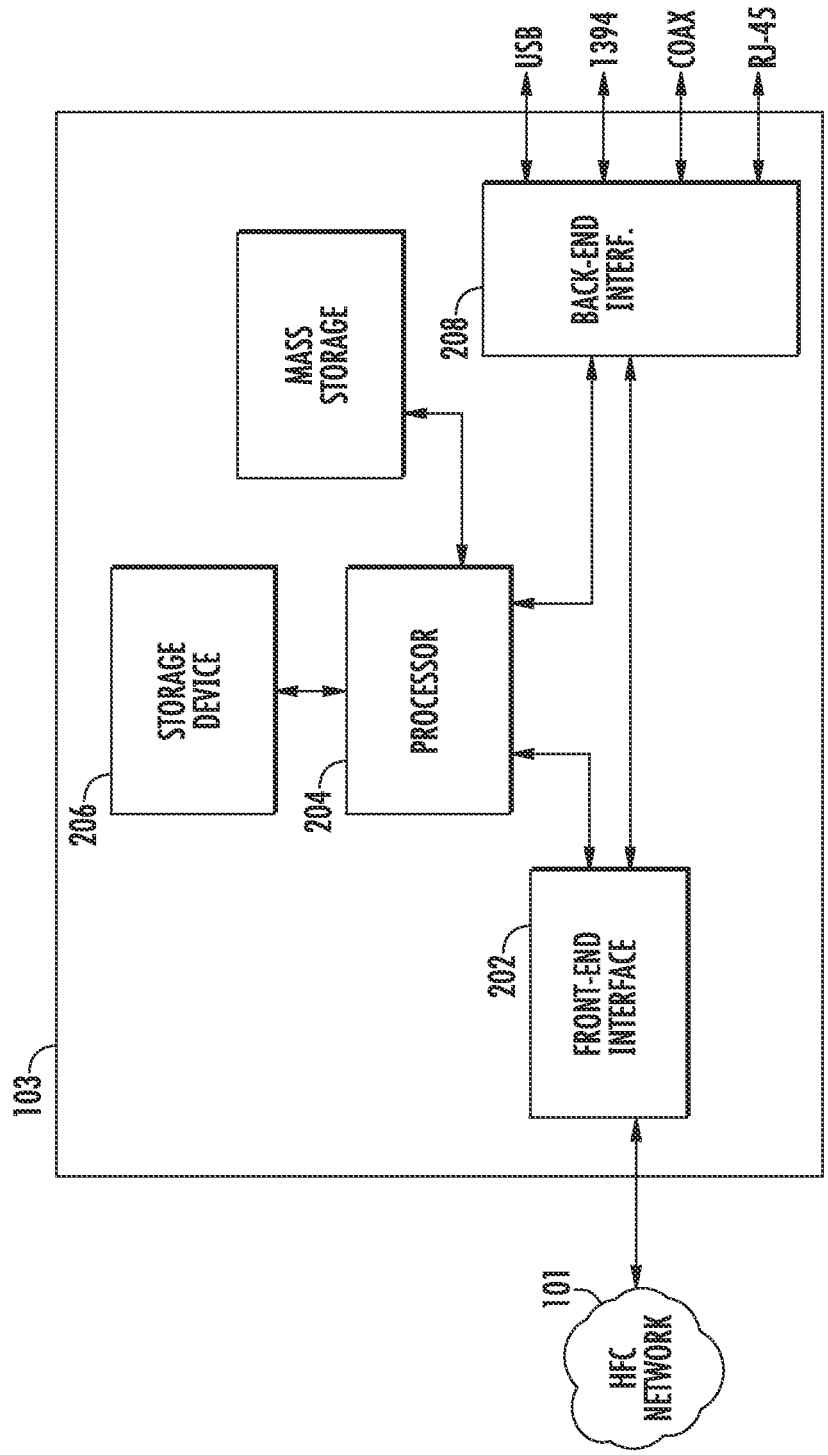
FIG. 2 is a functional block diagram illustrating an exemplary CPE (i.e., DSTB) for use within the scheduling trigger services architecture of FIG. 1.

FIG. 2 illustrates an exemplary embodiment of the improved CPE 103 with embedded trigger capability according to the present invention. The device 103 generally comprises and OpenCable-compliant embedded system having an RF front end 202 (including modulator/demodulator) for interface with the HFC network 101 of FIG. 1, digital processor(s) 204, storage device 206, and a plurality of interfaces 208 (e.g., video/audio interfaces, IEEE-1394 "Firewire", USB, serial/parallel ports, etc.) for interface with other end-user apparatus such as personal electronics, televisions, computers, or network hubs/routers, etc. Examples of physical ports or interfaces which may be used with the CPE 103 include, inter alia, wired RJ-45 connectors, RJ-11 connectors, RJ-21 connectors, coaxial cable connectors, BNC connectors, and the like, as well as wireless couplings to include for example IrDA, optical, IEEE Std. 802.11, Bluetooth 2.4 GHz, and 802.15 (e.g., OFDM UWB) or TM-UWB. For example, the front end interface 202 of the DSTB may comprise a satellite based receiver disposed within a DSTB (or vice versa), or alternatively an HFC coaxial cable connection, while the "back end" interface 208 comprises a Bluetooth or IEEE Std. 802.11(b) multi-device RF interface.

The storage device 206 may comprise, for example, RAM (e.g., SDRAM, EDO, DDR) which may also be supplemented with a mass storage device 207 such an EIDE Ultra-ATA, Ultra SCSI, or SATA HDD, or flash memory device, of the type well known in the art.

The CPE 103 may also be equipped as required with any other external communication devices that may be needed to communicate with external entities (such as non-MSO servers or the like, as described subsequently herein). For example, a modem (such as, e.g., the Silicon Laboratories ISOmodem embedded modem family currently used in the TiVo Series2 technology platform) may be used in the CPE 103. Such modems provide the analog connection that allows the CPE 103 to connect to the third-party servers to, e.g., update television program guide data, receive regular service updates, etc.

It will be further recognized that the present invention may be used in conjunction with or readily incorporated into "legacy" host devices (e.g. set-top boxes that currently reside in cable networks), thereby enhancing the flexibility of the present invention to existing cable system infrastructure. Many of these legacy host devices do not have integrated wireless interfaces. A separate device, such as a wireless dongle, must usually be provided to give wireless capability to the legacy host device, such as where the user wishes to interface with the E/AT application via a wireless remote control unit.

Other components which may be utilized within the device (deleted from FIG. 2 for clarity) include RF tuner stages, various processing layers (e.g., DOCSIS MAC or DAVIC OOB channel, MPEG, etc.) as well as media processors (such as for MPEG2 decoding) and other specialized SoC or ASIC devices. These additional components and functionality are well known to those of ordinary skill in the cable and embedded electronics fields, and accordingly not described further herein.

The CPE 103 of FIG. 2 is also provided with an OCAP-compliant monitor application and Java-based middleware which, inter alia, manages the operation of the device and applications running thereon. It will be recognized by those of ordinary skill that myriad different devices and software architectures may be used consistent with the embedded/associated trigger application of the invention, the device of FIG. 2 being merely exemplary. For example, different middlewares (e.g., MHP, MHEG, or ACAP) may be used in place of the OCAP middleware of the illustrated embodiment.

The Open Cable Applications Platform (OCAP) is a software programming interface standard that provides a common middleware environment for applications to execute on different types of consumer devices that may be connected to different cable systems. A high level block diagram of an exemplary OCAP software "stack" from the perspective of a host device various functional blocks at the top of the stack, including the "Monitor Application", Electronic Program Guide (EPG), Video-on-Demand Application, and any other applications (such as the embedded/associated trigger application (E/AT) described herein) deployed in a particular network. These applications are run on top of a software layer called the "Execution Engine" and interface to the Execution Engine using the well known OCAP APIs.

The CPE 103 will also include certain software applications or "Native Applications" that do not run within the Execution Engine, but directly run on top of the Operating System/Middleware for the host device. Native Applications are typically written for, e.g., a particular hardware configuration of the CPE 103 and for stringent interactivity requirements, and are represented by the lowest layer of the protocol stack. Examples of such Native Applications may include management of front panel functionality, remote control interaction, games, and the like. It will be appreciated that while the exemplary embodiment of the E/AT is designed to run at the top of the protocol stack, it may also feasibly be rendered as a Native Application running independent of the Execution Engine. Other software architectures are also possible. However, implementation via the higher layers allows the E/AT to be substantially platform-agnostic, thereby allowing its use in a more heterogeneous hardware environment (such as where multiple types of CPE are used within the same network).

The details of a particular cable network 100 that are relevant for the software to interoperate are also implemented via the protocol stack, and comprise a collection of protocols and behavior needed to support a particular cable network including (but not limited to) (i) an application protocol for communicating between application components that are distributed from the CPE 103 to other network locations, (ii) a cable network protocol for audio/video and data including application and System Information, and (iii) host support for CableCard interface and host resources.

HFC Network Applications—

Promotions and embedded/associated triggering are well suited to a variety of network architectures, especially the exemplary HFC network used as the basis of the embodiments described herein. Advantageously, MSOs are currently implementing cable and data systems based on standards that will allow the distribution of applications from various different sources. Several types of applications are contemplated in these environments, including: (i) MSO applications, (ii) content provider applications, and (iii) manufacturer applications. Each of these application types represents a potential avenue for distribution and implementation of the E/AT application of the present invention.

MSO applications are developed specifically for or by the MSO. These types of applications may have established protocols for communication with a counterpart application (component) running in a head-end. MSO applications are typically delivered to the CPE 103 or user-device using the OOB or DOCSIS channels, yet can be delivered using other means such as an in-band channel.

Content provider applications are developed for the content provider, such as a network (e.g., NBC, CBS, CNN, etc.) These applications may or may not communicate with a server counterpart component depending on (i) the relationship between the MSO and the network to run the server counter-part in their head-end(s), and (ii) the use of a standardized protocol (such as, e.g. H.323, SIP, etc.). These applications can be delivered to the CPE 103 using either an in-band or OOB channel.

Manufacturer resident applications will come bundled with the CPE/user device, or are otherwise installed or downloaded for installation by the user (such as via CD-ROM or Internet download). These applications may or may not communicate with a server counterpart component depending on whether an agreement is made with the MSO to run the server counter-part in their head-end(s), or a standardized protocol is used for communications.

In one embodiment of the present invention, the E/AT application previously described is developed as an MSO application running on the CPE, with a counterpart process at the head end or a third party server. This avoids any protocol translation or compatibility issues, since the application components are designed from the outset to be interoperable. However, the E/AT applications may be developed as a content provider or CPE manufacturer resident application if desired. In one embodiment, industry standard formats and protocols are employed to assure effectively "universal" compatibility between application components existing in the user's domain (e.g., CPE) produced by one vendor or source, and corresponding head-end or server components operated by the MSO or a content provider.

Metadata—

In one embodiment of the invention, the embedded triggers comprise metadata associated with the relevant promotion(s). Generally speaking, "metadata" comprises extra data not typically found in (or at least not visible to the users of) the network. This metadata may be validated against relevant specifications if desired, such as those provided by CableLabs. For each promotion other content with which the trigger is to be associated, a metadata file is generated that specifies which events are associated with that promotion. For example, a simple "one-association" promotion would include metadata that associates the promotion with one subsequent event (e.g., a movie). The basic metadata might specify the date, GMT or other start time reference, duration, and channel, and can be rendered in human-readable form if desired. It will be recognized that additional and/or different metadata content may be used consistent with the invention, however, such as providing user rating data for particular events, cost and subscription options (if applicable), etc. The metadata information can be packaged in a prescribed format such as a markup language (e.g., XML). The metadata may also comprise "graphics" metadata, such as that described in United States Patent Application Publication No. 20040177383 to Martinolich, et al. published Sep. 9, 2004 and entitled "Embedded graphics metadata", incorporated herein by reference in its entirety. International standards for audiovisual metadata, such as the ISO/IEC "Multimedia Content Description Interface" (also referred to as MPEG7), or the TV-Anytime Forum's "Specification Series: S-3 on Metadata", could also be used as the basis for metadata utilized within the present invention.

The metadata may be delivered with the promotion (such as for example via codes embedded in the transport stream indicating the location, duration, etc. of the metadata), or alternatively may be delivered via a separate communication channel (or the same channel yet at a different time). It may also be resident on the CPE, such as via a periodic update. The metadata (files) may also be encrypted; encryption algorithm information of the type well known in the art may also be included.

Metadata may also be used for conveying and formatting upstream data, such as that sent by the E/AT application upstream to the head-end servers, or to a third party networked server. This information might include, e.g., profile data on the various users at the premises, CPE profiling data, data on the uses or effectiveness of certain promotions, maintenance and error-related data, etc.

In addition, other implementation approaches may be used. For example, the transmitting source (e.g., head-end) could transmit a code within the promotion or associated therewith that identifies the promoted event, in lieu of a larger bandwidth file. This code may then be decoded at the receiver and cross-referenced to a database of events that has previously been (or will in the future be) received, or against a database at a third party entity (e.g., network server, on DVD, etc.).

The transmission system may include both an activate trigger and a deactivate trigger (e.g., embedded or associated metadata) to control the times during which the E/AT functionality is displayed by the CPE 103 on its associated display unit. For example, the activate signal may be sent at the beginning of the promotional piece; and the deactivate signal may be sent at the end. Either one or both may also be sent at other times. For example, the activate signal may not be sent until a certain point in the promotion is reached. Similarly, the deactivate signal may be sent before the promotion ends or at some point after it ends.

Embedded/Associated Triggering Software Architectures

Figure 3:
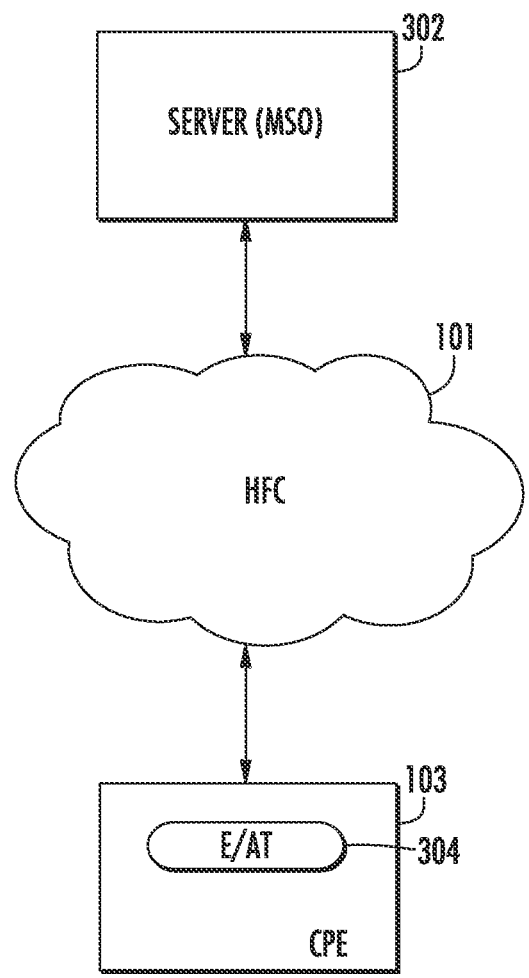
FIGS. 3-3e are functional block diagrams of various embodiments of network hardware/software architectures according to the present invention.
Figure 3A:
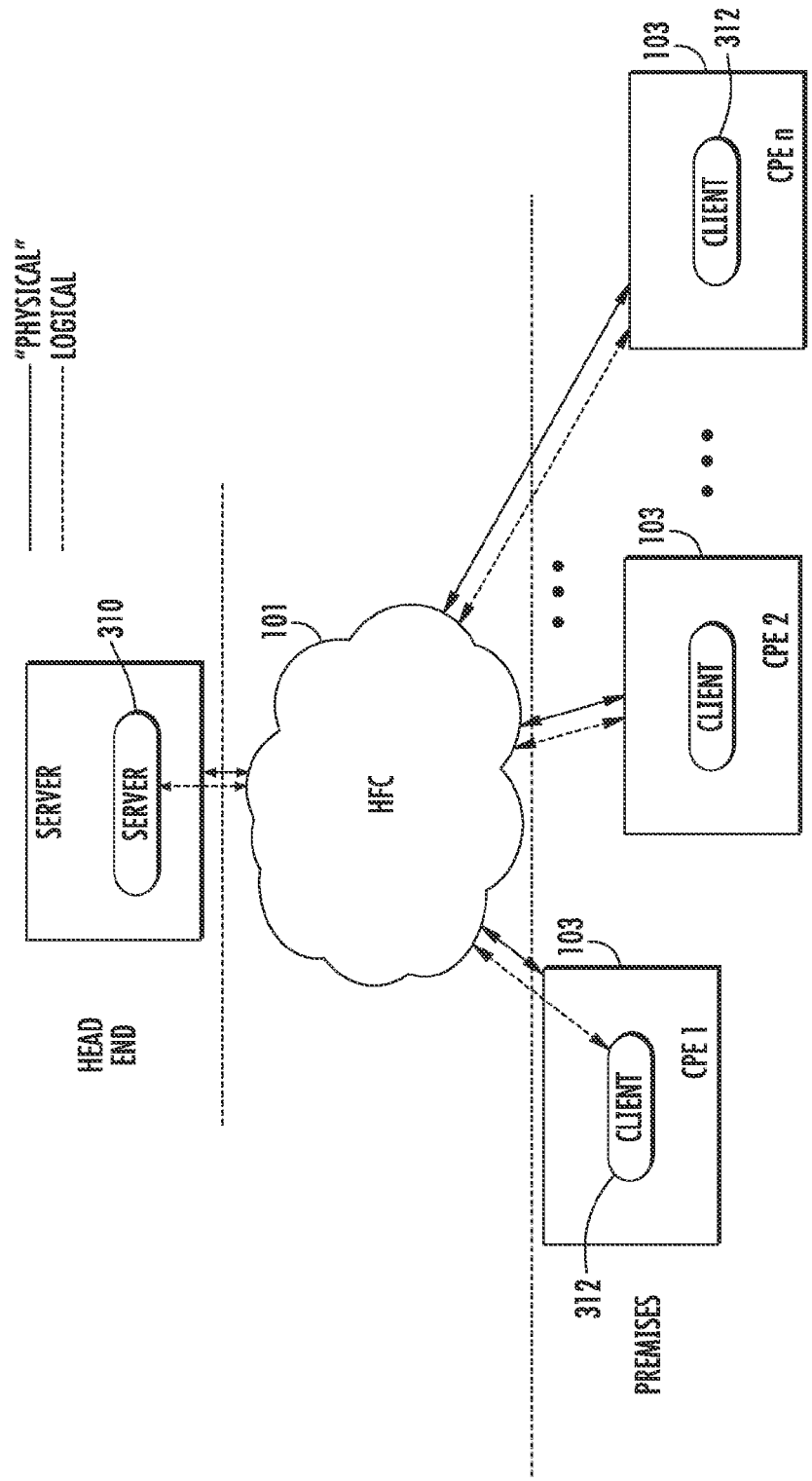
Figure 3B:
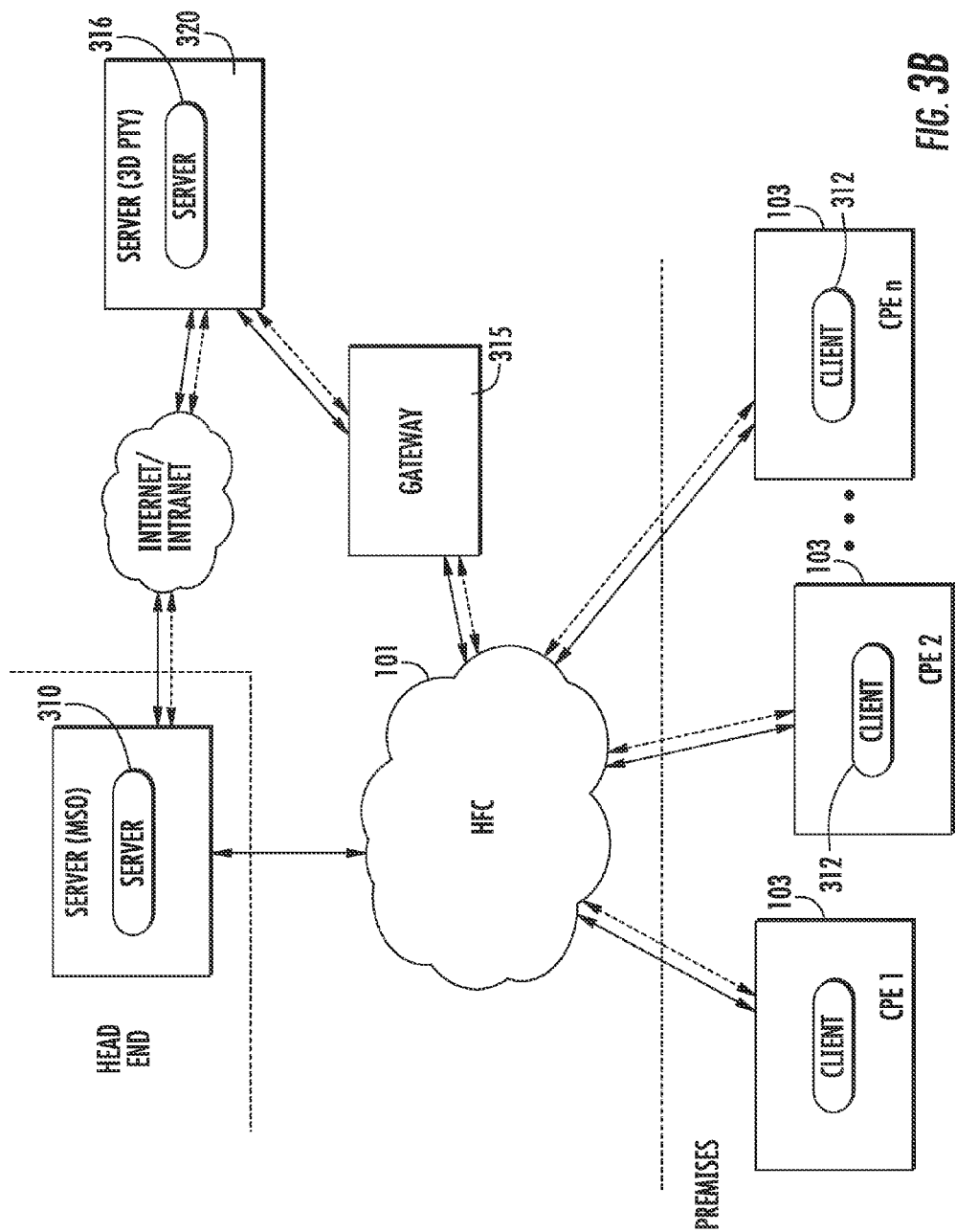
Figure 3C:
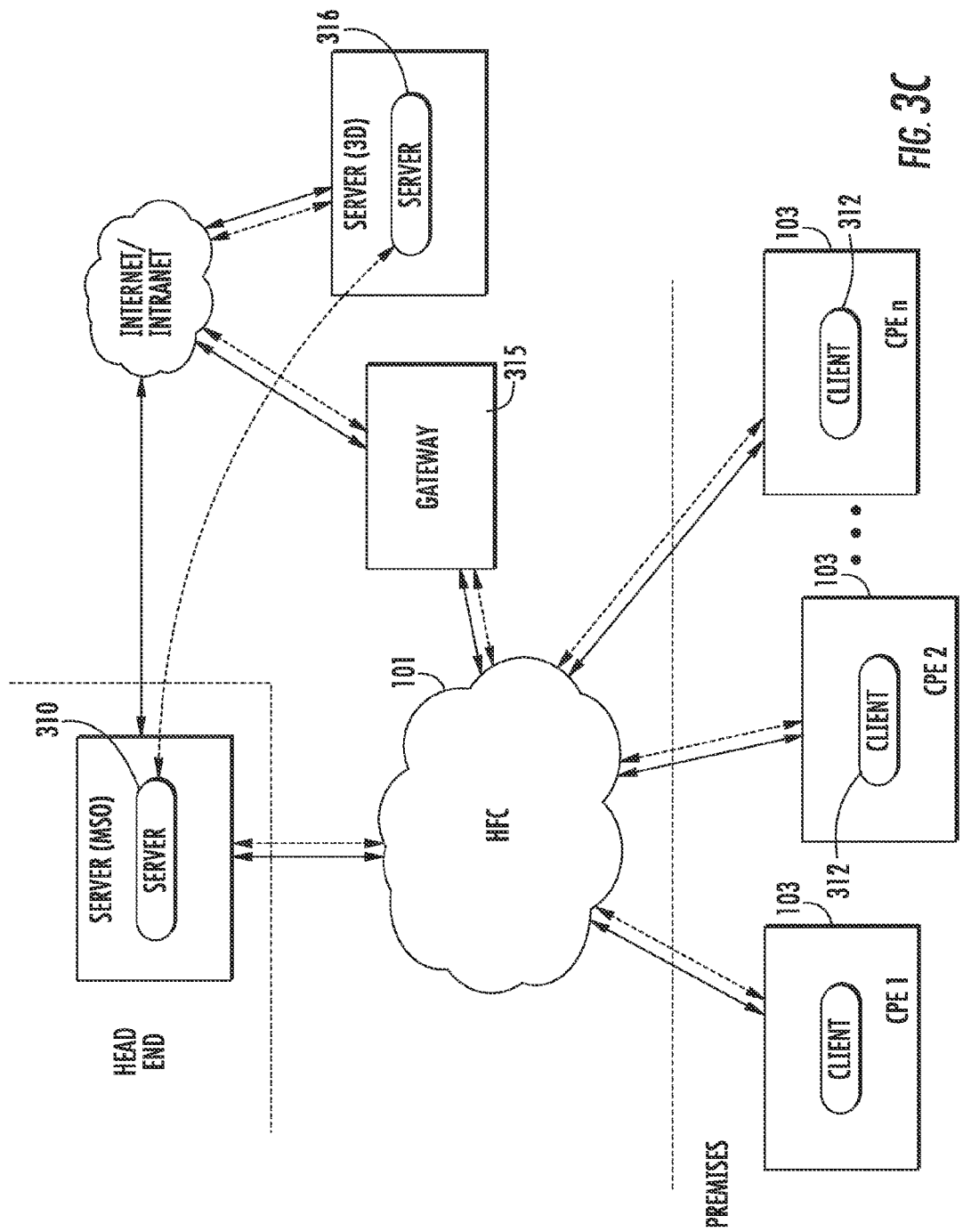
Figure 3D:
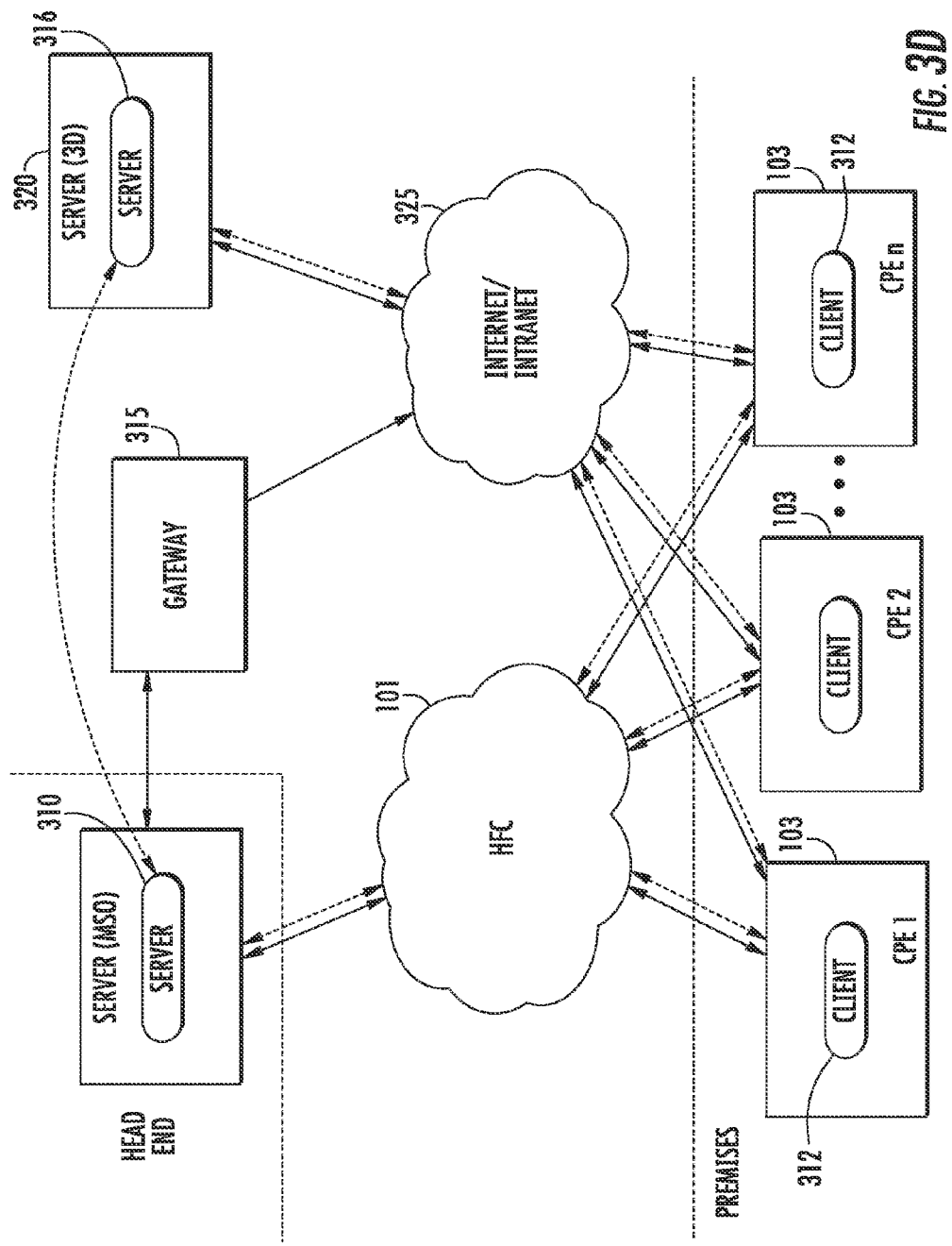
Figure 3E:
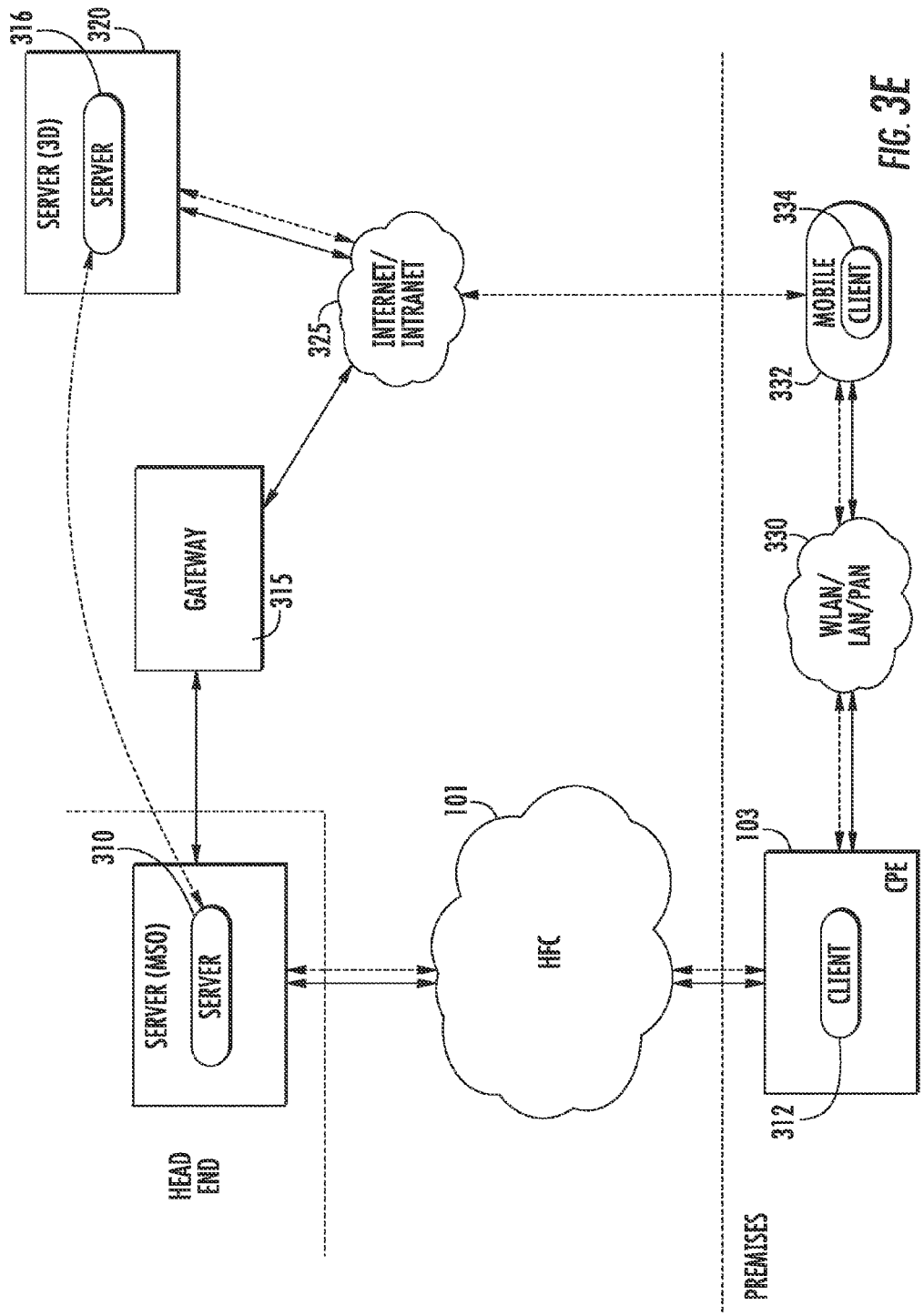

Referring now to FIGS. 3-3e, various different embodiments of software (and related hardware) architectures useful in implementing the invention are described. It will be appreciated that these embodiments are merely illustrative of the broader aspects of the invention, and hence should in no way be considered limiting.

FIG. 3 illustrates a simple architecture comprising a network head-end server 302 or other similar entity which is in signal communication with the HFC network 101. One or more client devices or CPE 103 are also in communication with the network 101, such as where CPE is located at the customer's premises. Running on the CPE 103 is an embedded/associated trigger application 304 of the type described elsewhere herein. The application may comprise an MSO application, content provider application, or CPE manufacturer's application. These may be delivered, inter alia, in-band, OOB, via Internet, or via other media such as CD-ROM or DVD. The application is stored in the form of a object-oriented computer program resident within the CPE (such as for example on its HDD, or in RAM), and is configured to interact with the operating system/middleware environment of the CPE 103 as previously discussed with respect to FIG. 2. The application utilizes data or metadata embedded in or associated with a given promotion streamed or transmitted from the head end of the network, such as by the MSO. Since there is no head-end portion of the E/AT application 304, the application is largely "stand alone", and only receives data/metadata (such as via the "triggered" promotion included within the in-band transport stream, or alternatively via an OOB channel) in order to provide the scheduling and triggering functionality. All records and files associated with the application and triggers, such as the user profiles, records of all scheduled triggers, promotion performance data, etc. are retained at the CPE and stored locally (at least temporarily) for subsequent use or delivery.

As shown in FIG. 3a, another exemplary architecture comprises a distributed application (DA) environment of the type well known in the software arts. For example, the apparatus and methods described in U.S. Pat. No. 6,687,735 to Logston, et al. issued Feb. 3, 2004 and entitled "Method and apparatus for balancing distributed applications", incorporated herein by reference in its entirety, may be used consistent with the present invention. The server portion 310 at the head end communicates with the client portion(s) 312 at each CPE 103 via in-band or OOB "physical" channels, thereby forming logical channels between the head-end process and the CPE portion 312. It will be recognized that as used herein, the term "physical channel" may include for example both wired and wireless modes, whether packet-switched, circuit switched, or otherwise.

In operation, the client portion 312 interfaces with the server portion 310 in order to transfer the requisite scheduling and trigger information, such as in the form of a metadata file. This information may be embedded within the promotional content itself, streamed or delivered alongside of the promotional content (such as via separate metadata file), delivered OOB, or "pulled" from the server (portion) by the client portion upon receipt of the promotion at the CPE. For example, the promotion may contain data such as in a preamble indicating that it is "E/AT enabled", thereby invoking the CPE to extract the transmitted metadata necessary to perform the scheduling trigger (or pull it from the head-end).

It will be further recognized that the communication established between the client and server portions of the E/AT DA can be used to transmit information to the head end, such as anecdotal or statistical data gathered regarding the use of the E/AT functionality within a given premises (e.g., how many times per given time period it is used, which members of the premises use it most and when, responses to individual promotions, etc.). The upstream communications can also be used to transmit CPE profiling data to the head-end process. For example, the apparatus and methods disclosed in United States Patent Application Publication No. 20020032754 to Logston, et al. published Mar. 14, 2002 and entitled "Method and apparatus for profiling in a distributed application environment", incorporated herein by reference in its entirety, may be used to perform CPE profiling if desired. Such profiling may be useful for, inter alia, determining CPE capabilities before in-band or OOB delivery of the E/AT application.

FIG. 3b illustrates another embodiment of the software/hardware architecture of the invention, wherein a third-party server 320 is utilized to provide some or all of the required E/AT functionality. The server 320 includes another server portion 316 of a DA that is in logical communication with the client portions 312 of the CPE 103. This server may comprise, for example, a third-party Internet server. Its server portion 316 can be used to receive information regarding, e.g., scheduled triggers from the CPE (i.e., it can act as a remote scheduling entity that can receive viewer trigger requests, etc. and then invoke them within the CPE at the appropriate time either directly via the gateway 315 to the HFC network 101, or indirectly via a communication to the head-end server process 310 via a connecting internet/intranet or other such communication channel). This latter approach relieves the CPE form having any storage capability and associated trigger logic, i.e., the CPE need not store a file or other data to compare to a local time reference or the like to "remember" when to tune the receiver portion of the CPE to the appropriate channel. Rather, the remote entity (or head-end process) determines and invokes the trigger at the desired date/time.

The server portion 316 can also actively and dynamically configure the promotional content delivered to the CPE 103. For example, where a given promotion run at time t produces a very high response or performance rate (as determined by, e.g., upstream communications sent from the CPE to the third-part server 320 upon scheduling by the various viewers of the promotion), the server process 316 can generate a recommended or target package for the MSO or network for subsequent promotions. This process can be nearly instantaneous, such that promotions scheduled for delivery within minutes or even seconds of the time=t promotion can be adjusted (e.g., swapped out for others, shortened, lengthened, etc.) effectively on-the-fly. This process would be seamless to the viewer(s).

The server portion 316 can also (or alternatively) be used to manage more ancillary functions if desired, such as receiving data and statistics from one or more CPE 103, and then compiling and forwarding reports to the relevant MSO or other entity (e.g., content development network such as CNN, NBC, etc.). For example, in one business model described herein, the MSOs or networks subscribe or pay for each trigger that carries E/AT functionality. Part of this subscription/payment is a follow-up report from the third-party service (e.g., Cable Select) that indicates which promotions were most successful, demographics of likely viewers, promotional effectiveness ratings (PERs), etc. (see FIG. 4j herein).

FIG. 3c shows yet another alternate architecture, wherein the client portions 312 of the CPE are in communication with the third-party server process 316 via the gateway (e.g., Internet gateway) 315 and the Internet. For example, the CPE may access an internet URL via an upstream channel on the HFC network 101, the server portion 316 then taking the required action as described above with respect to FIG. 3b. This action may also include a direct "push" of a trigger or trigger data to the CPE via the head-end server process 310.

FIG. 3d illustrates yet another embodiment, wherein the internet/intranet 325 is used as an external interface for the CPE 103, such as a DSL line, Ti line, ISDN, dial-up/modem, satellite link, or even a cable modem from another MSO. Specifically, rather than route upstream communications via an OOB or similar HFC network channel, the client portion 312 of the CPE 103 sends communications upstream via the internet or intranet 325 to the third-party server 320 and its server process 316. This server process 316 can be in communication with that of the MSO server, as shown via the internet/intranet and associated MSO gateway 315, although such communications may occur via any number of different paths.

The approach of FIG. 3d allows the operation, maintenance, and function of the E/AT application and services to be substantially divorced from the HFC network and MSO. This way, the third-party service is completely stand-alone; the internet/intranet can be used as the forward or downstream channel for EA/T application and upgrade delivery, and reverse or upstream communications to the server 320 with viewer (or CPE) profiling information, promotion response data, etc. If desired, the third party server 320 can also be used to schedule and remotely invoke tuning of the CPE or other required actions needed to support the trigger scheduling and function.

FIG. 3e illustrates still another embodiment of the software/hardware architecture, wherein a mobile unit 332 (e.g., PDA, handheld, "smart" phone, laptop, etc.) is used to interface with the internet/intranet 325 and also with the CPE 103. The mobile unit 332 includes an E/AT client portion 334 of the DA that permits the mobile 332 to select and schedule events for the CPE 103 based on promotions received over the internet/intranet 325. For example, a webcast that is transmitted via the internet 325 may include a short promotion for a program carried on one of the networks carried by the MSO. The local or mobile client portion 334 of the DA (e.g., a Java-based application running on the O/S of the mobile unit 332) allows the user to invoke and select the promoted event for scheduling via the mobile unit. This "proxy" scheduling data/metadata is transmitted to the client portion 312 of the CPE 103 (such as via a LAN, WLAN, PAN, etc. 330), wherein it is treated just as if the client portion 312 had generated it. For example, a metadata file with the trigger information is stored on the CPE, this file initiates tuning of the CPE receiver to the appropriate channel (and other E/AT functions such as on-screen warnings before tuning as shown in FIG. 4f).

Promotion and Embedded/Associated Trigger Operation—

Various aspects of the delivery of the promotion(s) utilized by the present invention, and the operation of the embedded/associated trigger functions, are now described in detail.

As previously discussed, the trigger-enabled promotional broadcast or content delivery may be part of a television (over-air) signal, a cable signal, a satellite signal, a multimedia stream, or any other type of communication media. It may also be used in a non-broadcast delivery mode, such as physical media (e.g., DVD or CD-ROM). It will be recognized that the terms "promotional broadcast" and "promotion" may refer to content which is contemporaneously transmitted and delivered (e.g., an over-air or over-cable broadcast that is ephemeral in nature), as well as that which may be temporally or anecdotally delayed (e.g., a PVR or on-demand delivery of content) or even recorded in a tangible medium (such as pre-coded promotions which are stored on a DSTB hard drive).

In the exemplary embodiment, the user interface (UI) for the E/AT functionality comprises a menu-driven display of the type generally well known in the art (see discussion of FIGS. 4a-4j below). As used herein, the term "menu" refers to any cognizable data or information structure which allows the selection of at least one option. Menus may be visual in nature (such as the traditional computer pull-down menu or on-screen television programming menu), or alternatively may be rendered in an audio or other format (e.g., akin to the way one navigates a voice-mail system, whether by entry of tactile (visual menu or button commands) or verbally, such as through a speech recognition algorithm. Speaker identification (i.e., identification and authentication of a user) may also be used for certain situations, such as a TV-commerce, PPV, on-demand, or e-commerce transaction requiring action by the user. For example, scheduling delivery of an "R-rated" or adult PPV event to a premises can be safeguarded by requiring an adult within the premises to authenticate the order using a stored voiceprint spoken at the time of event scheduling/selection. The menu may be of any type (e.g., pull-down, bar, window(s), etc.) and may include a broad variety of optional selections. For example, the menu may include a "Schedule Viewing" option and a "Set Reminder" option as two of its features available to the user. Additional functionality such as reminder parameters (e.g., audible/visual reminder, frequency of reminding as the event approaches, "snooze" functionality, e-mail reminders, etc.) may also be provided. The programming of such functionality within an application or other delivery vehicle is well known to those of ordinary skill in the programming arts, and accordingly is not described further herein.

In one embodiment, when the viewer selects a scheduling option (e.g., "Schedule Viewing") of the menu, his/her receiver may automatically be set to change to or automatically tune to the channel on which the promoted event is scheduled to air at its scheduled date and time.

If the user instead selects reminder option (e.g., "Set Reminder"), their receiver may issue one or more reminders before invoking any tuning action. For example, in one simple variant, the receiver issues a reminder at (or shortly before) the time that the promoted event is aired. The reminder may include, for example, (i) the title of the item, (ii) its start time, (iii) duration, and (iv) its channel. The reminder may also include a menu selection that automatically switches to the appropriate channel if selected (auto-tuning). In a more complex variant, the receiver issues reminders at multiple predetermined times, such as for example in the same time slot as the target event, but one week or one day before, or both, or with increasing frequency as the date/time of the scheduled event approaches.

The reminders may be channel agnostic (i.e., are generated irrespective of what channel the user is tuned to), or channel specific (i.e., are generated only when the viewer is tuned to the same channel as the scheduled event, or alternatively a prescribed set of channels determined by the user or MSO).

Alternatively, the reminders can be anecdotally determined, such as during a program that has similar content or theme to that selected by the user, irrespective of when that program may occur. For example, if a reality genre event is selected for future viewing, the reminder algorithm of the present invention may identify all other reality-based programs being aired between the current time and the date/time of the scheduled event (optionally filtering those being aired on channels not available or subscribed by that particular user), and then displaying a reminder during each such program concerning the scheduled event. The logic in this approach is that one selecting an event of a particular genre for future viewing would also be likely to watch other similar genre programs. The identification of similar genre events can be readily determined via the data supporting the EPG; e.g., by performing a search for all reality programs, the latter which may be identified by a unique "class" or genre identifier for such purposes.

Note that the foregoing approaches are merely exemplary and illustrative of the broader principles of the invention. Numerous other reminder schemes (including variations and combinations of the foregoing) will be readily appreciated by those of ordinary skill provided the present disclosure.

In addition to reminders and scheduling as previously described, an option may be included within the menu structure or other UI to have the promoted item recorded, in lieu of or in addition to the reminder(s) being given or the channel being changed for viewing at the time of the promoted event.

The embedded or associated trigger(s) may also include a "subscribe" selection for those future events that take place on more than one occasion. The selection of this option may cause the system to switch to this channel each time the particular instantiation of the event begins. In one variant of the invention, this subscribe functionality is implemented based on a predetermined schedule of events, such as for a program that airs once a week. In another variant, the "subscribe" functionality can be triggered by or coupled to information which may not yet be in existence at the time of scheduling the trigger(s). For example, where the schedule of the NBA finals or World Series is unknown at the time of scheduling (say, before the first game is even played), the embedded trigger algorithm can be used to query (or alternatively receive in a broadcast or point-to-point mode) a remote scheduling entity, such as corresponding software process resident at the head end or service provider in a cable network, in order to obtain the necessary information to schedule the required triggers. For example, selected but uncompleted triggers can be periodically polled by the software process resident on the user's CPE or receiver, and a periodic upstream query transmitted to the relevant head-end entity or process to provide the required schedule/channel information. In response, the head end process or other entity tasked with responding can issue the requested information in a downstream in-band or OOB communication (e.g., packets), or alternatively issue a packet or sequence of packets that alert the requesting entity as to the status (e.g., "NOT AVAILABLE", "WAIT" or "CHECK BACK AT 00:00:00 GMT") when the information is not yet available. The CPE process can then periodically check back with the head-end process until the information becomes available. Alternatively, the information can simply be broadcast from the head-end downstream unsolicited, such as at periodic intervals or in carousel fashion once it becomes available.

When the requested information is received, it can be used to complete the relevant trigger(s), thereby allowing such trigger(s) to be issued at the appropriate times; e.g., to record or tune to the correct channel at the times of each subsequent game.

A broad variety of technologies may be employed to allow the viewer to make a selection from the embedded trigger(s). These include use of an existing remote control (e.g., wired or wireless IR, RF, or ultrasonic), a wired or wireless add-on device, one or more controls on the receiver itself, or even an interface to a computer system or network, such as the Internet. In one variant, the functionality contained within the user's existing remote and CPE (e.g., DSTB) are used, thereby making the selection of events from triggers seamless. In another variant, the user's DSTB or other CPE is connected to a wireless interface, such as via the IEEE-1394 or other port of the CPE, wherein the user can make selections remotely via a wireless device such as their PDA or handheld computer. In another variant, the CPE is connected (such as via an 802.3 or USB interface) to a PC or other computer which is adapted to allow the user to navigate and select the various features of the menu remotely. For example, the embedded trigger may be broadcast, and communicate with the remote PC so as to allow an application resident on the PC (e.g., browser window or Java Applet) to notify the user, display the menu, and allow the user to make selections which will then be transmitted back to the CPE (such as via a standard packetized protocol). In this fashion, a user working on their PC, handheld, etc. can be alerted to an impending event without having to actually be watching their television or using their CPE directly.

It will also be appreciated that embedded triggers and reminders can be queued, such as in a storage queue or FIFO within the user's CPE or other location, for subsequent use. For example, when a reminder is issued against a scheduled trigger, and the user's CPE is not operating, the reminder can be delivered at the time when the user next operates their CPE (or PC or other connected device) much in the way that conventional e-mail is stored on a server. These reminders may be stored or queued at a remote location (e.g., a remote "reminder" server) at the head end or on the Internet, or locally within the CPE or other connected equipment. The delivery of the queued reminders or triggers can also be made subject to user control; i.e., the user selecting a "view stored reminders" or similar function on their remote menu for example.

Similarly, triggers can be delayed and/or queued as well. For example, where the user's CPE is not operational at the time a trigger is invoked, the trigger software process on the CPE can detect when the CPE is not operating, and store or recycle the trigger until the CPE is activated. Hence, when the user arrives or tunes in after a triggered event starts, the trigger stays active to immediately tune the user to the scheduled event upon commencement of their viewing activities. These "delayed triggers" can also be made configurable to the user (or even a remote head-end or other software process), such as e.g., where the scheduled event will only be triggered where >X % of the total duration of the event remains, or where no other scheduled triggers exist with overlapping time slot and that also have not yet begun. They can also be made user "permissive", such as where an affirmative action (or lack of action), such as a menu selection or "OK" by the user is required to allow the trigger to be invoked and tune the CPE to the required station at the designated time.

It will be recognized that a trigger need not be embedded in every promotional broadcast. For example, a trigger may only be embedded in a promotional broadcast when payment for that trigger has been made, such as by a sponsor of the promoted event. In one business model (described in greater detail below), the trigger is provided on a per-use basis, such as where the MSO charges a network or other content source $X per embedded trigger. In another model (which may be used with the prior per-use model), the MSO selectively delivers triggers to one or more sub-classes of its subscribers, e.g., as a "premium" feature, or as part of a subscription service or package. The triggers may also be distributed based on demographics; i.e., in those markets, geographic areas, or strata of subscriber (based on, e.g., information or profile obtained from that user at time of subscription or thereafter) where the most likely or frequent selection of the given trigger exists. For example, the MSO may target an embedded trigger regarding the PGA Master's golf tournament to only its "premium" customers, or those having a profile indicating income above a certain level, since these are the most likely users to select the trigger for subsequent viewing.

Note that the distribution of the triggers may be on, inter alia, a (i) per-trigger basis; (ii) per-time period basis (e.g., delivered only for a period of time); (iii) per-logical channel or viewer basis (i.e., delivered only to the CPE or other equipment of one or an associated group of subscribers); (iv) based on another precedent event or trigger (e.g., where a given trigger is delivered only when one or more triggers are previously delivered ("trigger mask"); and (v) as part of a contemporaneous or staggered trigger package (i.e., coordinated with one or more other related or unrelated triggers).

The trigger functionality provided by the E/AT application of the present invention can also advantageously be integrated with PPV or on-demand (OD) session functionality, so that a promoted future event can be scheduled and triggered at a later time. For example, a promotion for OD movies available next month on the given content (e.g., cable) channel or service can be scheduled via the trigger, such that the user is reminded when the movies as a whole become available (say, the first of the month), and/or reminded of individual instantiations of a desired movie. So, one user may simply wish to be reminded when the new OD titles are accessible for viewing, while another user may desire to know each time a prescheduled PPV or similar event is impending. The E/AT application can also cause activation of the event, such as by initiating the OD or PPV selection process by negotiating with the head-end or other providing source to stream the content (and any ancillary applications which may be required) to the viewer at a prescribed date and time.

It will also be appreciated that an "accounting" system may advantageously be employed with various embodiments of the invention that tracks the menu selections that are made from the embedded triggers, as well as from elsewhere. The selections made by one or more viewers may be tabulated, analyzed, and/or delivered to one or more interested parties, such as sponsors of the promoted events or content sources (e.g., networks, studios, etc.). Among other uses of this data, the sponsors may determine which promotions and which time slots (e.g., time/day) are yielding the greatest number of "hits", greatest PER, etc.

In a more sophisticated approach, the data may also be analyzed in terms of higher level or more abstract correlations, such as which demographics of user are most likely to select a given event (or events in general), correlations between the best performing time slots and user demographics, correlations to programming immediately or following the scheduled promotion trigger and/or event (e.g., to identify "carryover effect", where the users from one previous program are more likely to select the promoted event based on a trigger immediately following the previous program, as opposed to another previous program).

This information may be used by the sponsors, networks, studios, MSOs, or other entities to tailor the content, number and/or the positioning of the promotional broadcasts that remain before the event is aired, etc. For example, if it is determined that promotions with triggers are most often selected to select a reality genre program (e.g., Survivor™), then the promotions with triggers can be selectively or preferentially disposed proximate to other reality programs in the program viewing space, such as immediately after an episode of another reality genre program. Alternatively, where a limited number of promotional slots exist, the MSOs or networks can preferentially allocate a higher percentage of the available slots to reality genre promotions (and triggers), divining that these may have a higher yield than other types of programs. The information derived from the E/AT system may also be used to schedule or allocate bandwidth, such as between high-definition (HD) and standard definition (SD) bandwidth on the downstream channels.

A viewer may also intentionally or unintentionally schedule more than a single event at the same time. The system may be configured to alert the viewer to the conflict and to allow the viewer to resolve this conflict by selecting just one of the events. Alternatively, the user can port one of the events to another device (such as one connected to the IEEE-1394 port on the back of the CPE), such as allowing a digital recording device (e.g., TiVo or another DSTB with hard drive) to record the first event, while viewing the second event in real time.

Additionally, data concerning the existence of these conflicts (and/or the resolution of them) may also advantageously be gathered from one or more viewers, and may also be provided to the sponsors, MSOs, etc. Such information may assist these entities in determining when events should be scheduled and/or if a particular event should be rescheduled.

Data concerning whether one or more viewers actually views an event that has been scheduled may also be gathered and similarly presented to sponsors or other interested persons.

The data gathering and reporting system may be implemented in a broad variety of ways. In a cable network system, for example, the choices made by the viewer may be gathered by his receiver and transmitted back through the cable system to a central location or sub-location, such as previously discussed herein with respect to FIGS. 3-3e. The information may be transmitted at the moment the selection is made (contemporaneous) or it may be saved in the CPE (or elsewhere) and transmitted on a periodic or other basis.

If sub-locations are used (e.g., nodes within a given network that aggregate information from a subset of the subscribers), the information from each sub-location may be sent to a central location such as a third-party server for compilation into a single database. Alternatively, in a distributed processing model, some or all of the processing or pre-processing required for the data can be performed at each sub-location/node, thereby alleviating the burden on the central node or server. The viewer's CPE 103 can even be utilized as a distributed processing or pre-processing node in this regard.

The data representative of the selections that are made by the viewers at the premises may include an identification of the user that made the selection (including the particular member of a family that is using the CPE); the time and date of the selection; the station and program that was being watched at the time of the selection; and demographic information about the viewer that made the selection.

As described in greater detail herein, the central or sub-location may make the data available to users (such as MSOs, networks and sponsors) in a broad variety of ways. Reports may be generated and sent electronically or on paper. The database may also be made accessible in any of a number of ways, including at an Internet website or an FTP site. Different users may be given the opportunity to request different types of reports which may then be generated and distributed accordingly. Systems for billing and receiving payments from the third parties for the triggers and/or reports that they request may also be included with the system. Various business methods for payment for the services are envisioned, including pay-per-use, subscription, variable rates based on use, etc.

Cross-Platform Operation—

As referenced above, another embodiment of the invention allows for cross-platform/environment utilization, wherein the embedded or associated schedule trigger is delivered in one environment (such as on a DVD rented or purchased, or over the Internet), and correlated with an event in another environment (e.g., cable TV or satellite service). This cross-platform functionality can be implemented using a number of different schemes, including for example saving data or metadata associated with the promotion on the user's CPE (such as in a HDD) for subsequent use by the CPE in tuning to the scheduled event. Specifically, the promotion might include the necessary data for the event to be scheduled, which can then be extracted and saved onto the CPE or other device upon viewing the promotion and selecting the event (such as via the Cable Select software).

In one exemplary embodiment, the E/AT application can locate the data/metadata within the media carrying the promotion (say, e.g., a DVD) and extract or read it, saving it to a similar or corresponding data structure (e.g., file) on the CPE, such as via a data interface between the DVD player and the CPE. This can be accomplished by simply porting all content read or decoded off the media to the CPE, which then selectively locates the required data therein and generates the required file or other data structure for storage on the CPE. Alternatively, the DVD player or other such device can be provided more intelligence, such as a "client" or distributed portion of the E/AT application, which can communicate with the parent portion (on the CPE) so as to extract the required data.

For example, in one variant, the E/AT application resident on the CPE receives the extracted data via the interface port (e.g., IEEE-1394 or USB port), and generates a metadata file that is subsequently used by the E/AT application in invoking tuning to the desired event at the prescribed date and time.

In another variant, the DVD or such device can be configured to include an application or software process which extracts the data and sends it according to a predetermined protocol to the CPE via another network entity, such as a third party Internet server.

In another variant, the media (e.g., DVD) contains information such as a URL or other network address where the CPE (application) can retrieve the data/metadata that the application needs to perform the subsequent tuning. The E/AT application then accesses the URL or address via an upstream channel on the HFC network to obtain the required information. This approach has the distinct advantage of the MSO or content provider being able to update the information as required, such as where the broadcast schedule changes.

In the case of an Internet promotion (such as via a Webcast or the like), the user's PC, laptop, handheld, etc. can contain a distributed or client application 334 (see FIG. 3e) that interfaces with the relevant URL to obtain the necessary information for the scheduling and tuning of the event.

This information can also be e-mailed or otherwise pushed to the user as well. The client portion of the application 332 then passes this information to the CPE via any number of different data interfaces and protocols such as via a home WLAN to which both units are attached, Ethernet signaling over CAT-5 cabling, USB port, FireWire, etc.

An indirect or proxy "pull" can also be used, such as where the user's PC or other such device has a client portion of the application with which the user can interface, yet which acts as a proxy for the CPE portion of the application. Hence, when the user selects the promoted event for viewing on the PC (such as via their mouse), the client portion in effect asks the URL or other relevant network entity providing the trigger information to direct the information to the CPE, such as via an Internet connection provided by the MSO to the CPE, an OOB channel, an in-band channel, etc. This way, there need be no direct connection between the proxy (PC, laptop, etc.) and the CPE. The user need merely provide the CPE address information to the providing entity, thereby allowing the user for example to view a Webcast (with promotion) at work, and select the promoted event for viewing at home via the E/AT client portion on their work PC.

Methods of Doing Business—

Figure 4:
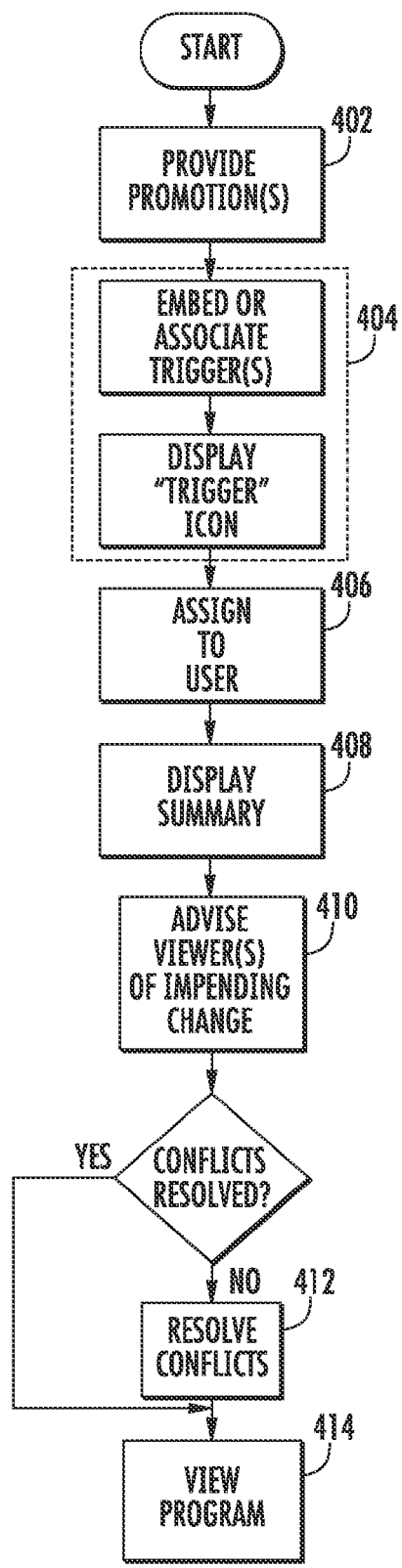
FIG. 4 is a logical flow diagram illustrating one exemplary method of doing business according to the present invention.
Figure 4F:
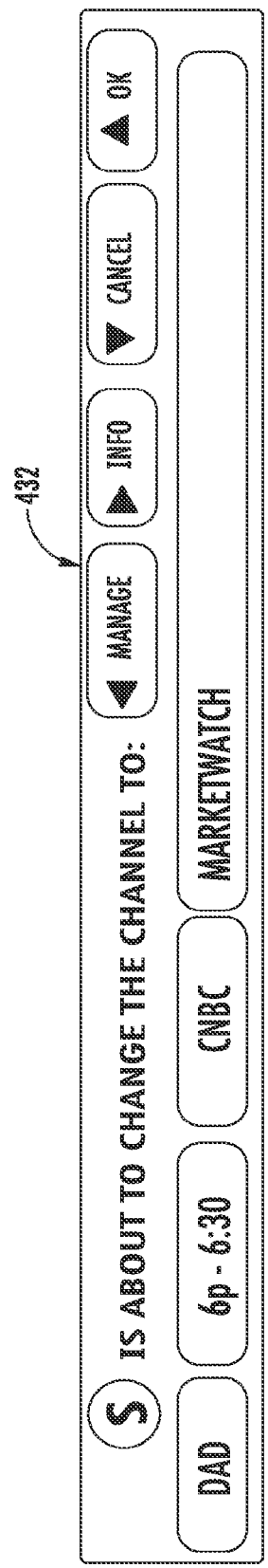
Figure 5:
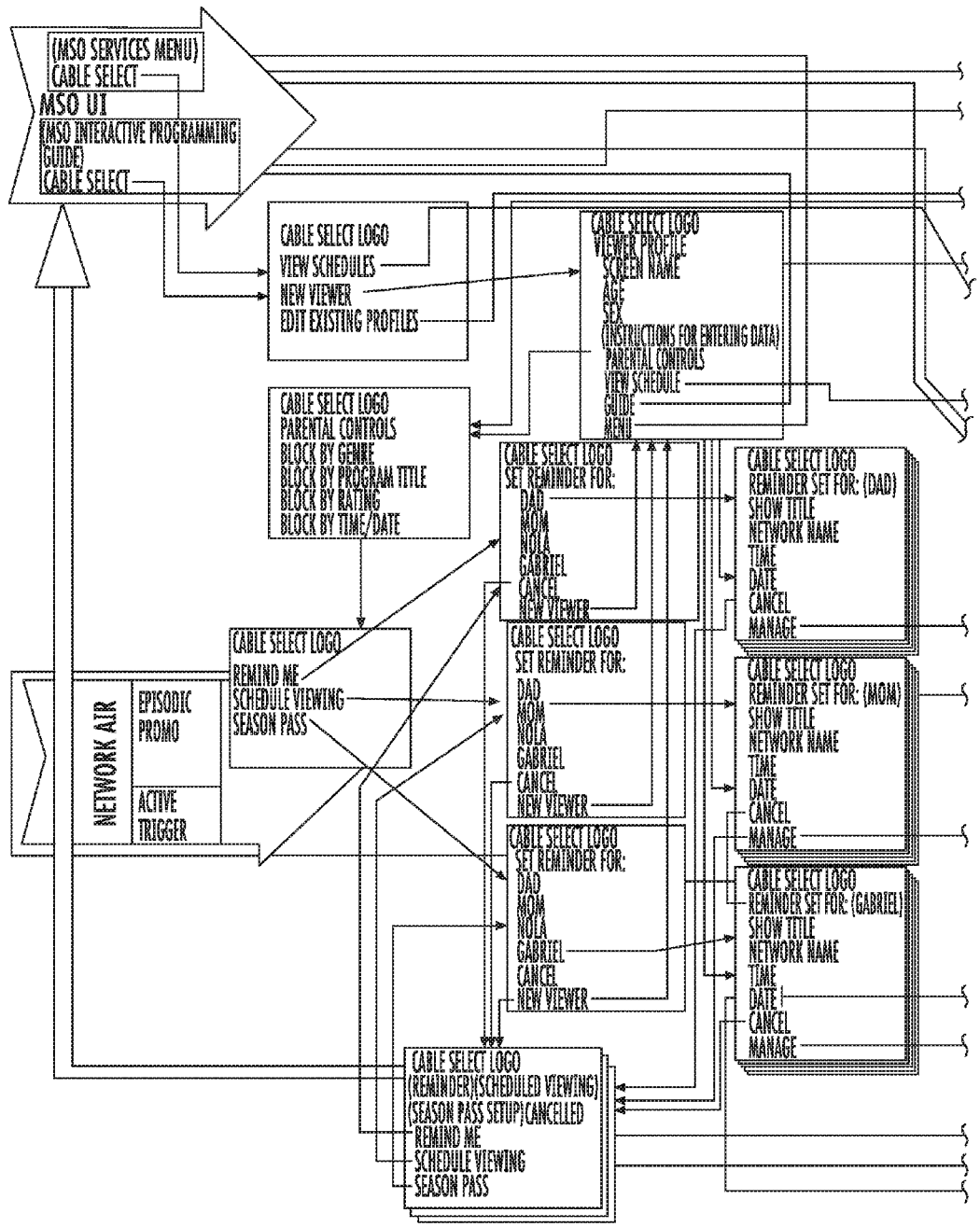
FIG. 5 is a logical flow diagram illustrating the flow of information and the associated menu choices that may be presented on the display according to one exemplary embodiment of the present invention ("Cableselect").
Figure 5:
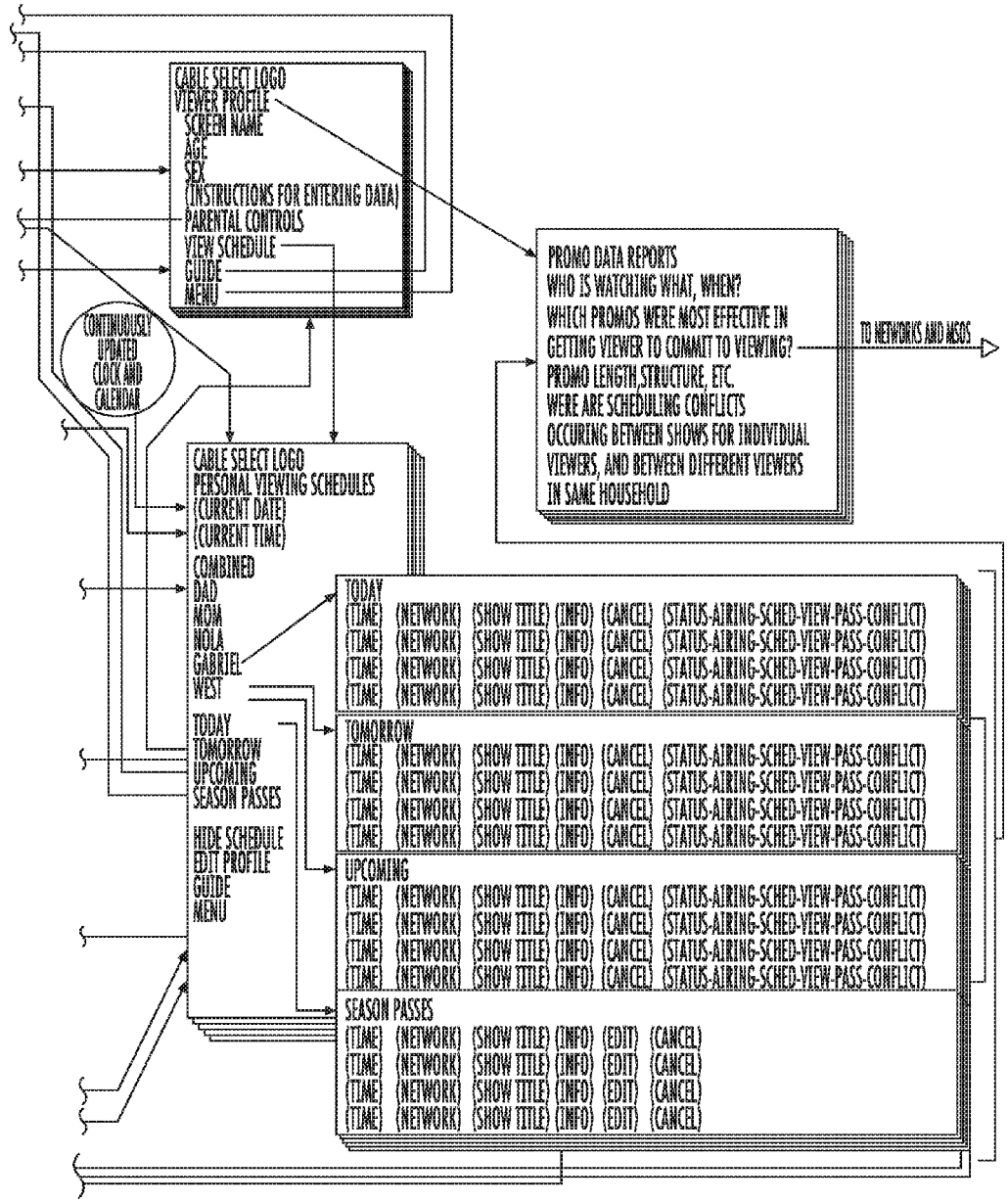

Referring now to FIGS. 4 through 5, exemplary methods of doing business according to, and business models employing, the present invention are described in detail. It will be recognized that while the following discussion is cast in terms of an exemplary commercial paradigm and software/hardware environment (i.e., the "Cable Select™" service provided over an HFC cable network), this embodiment is merely illustrative of the broader principles of the invention, the latter being in no way limited hereby.

At a high level, Cable Select is a tool that allows viewers to make their viewing choices when their desire to view is ostensibly at its strongest, such as during a promotion for the event of interest. Such promotions are intentionally designed to heighten the viewer's interest, and accordingly represent an excellent opportunity to obtain new viewership for a program or event.

Furthermore, scheduling their viewing choices in this manner eliminates the need for the viewer to remember vital tune-in information about what network, time, and date the program they are interested in will air, thus overcoming the flaw that has existed in On-Air promotion since the debut of television.

Networks and MSOs that take advantage of Cable Select will also be afforded a metric to estimate how many and the type of viewers that plan on and commit to watching their programs. While some viewers may change their mind subsequently, and some viewers who do not select a trigger will view the program anyway ("direct tune-in"), the aforementioned metric is useful at projecting the interest level in a program, and can even be used as a priori and a posteriori information (for the scheduled event or another similar related or subsequent event) for determining advertising content, promotional content during that scheduled program, etc.

Similarly, Cable Select also allows networks and MSOs to gather information about how effectively their promotion strategy for any given show is working in time to modify and improve it. Networks using Cable Select triggers can start promoting programming events several days, weeks or even months before the scheduled event, with multiple versions of the promotion, and refine their approach by e.g., airing the more successful promotions more often, and eliminate those that do not deliver a commitment to view or which otherwise yield unsatisfactory results. This evolutionary approach is even more effective when the scheduled programs air in a series over a more protracted period of time.

Additionally, networks and MSOs can use the Cable Select triggers in promotions for events that haven't been produced yet in order to test audience appeal (test marketing). They can discover from the data collected, for example, which members of a typical household (or even individual households) are viewing, and when. They can also see where scheduling conflicts arise, and react accordingly, such as by scheduling events or programs such that conflicts between the programs are avoided.

Networks spend millions to tens of millions of dollars annually on promoting programming on their own air. Cable Select helps them use their budgets more effectively and efficiently by redirecting a small portion of it into the purchase of Cable Select promotional triggers. Doing so helps ensure that the viewer's desire to view becomes a tangible commitment to view their shows. It also gives networks useful data about viewer's desires and behavior, which can be used to create and adapt their programming and promotion strategy.

In one variant of the business model, MSOs charge the subscribing networks or studios for each trigger that is placed in their promotions. Users (e.g., home viewers) are not charged for the triggers, as in other prior art paradigms (e.g., TiVo).

This can be, for example, a percentage of the total cost of the promotion. Discounts or graduated rates as a function of the number of triggers subscribed by a given entity can also be utilized, thereby providing incentives to the networks to subscribe. Furthermore, the rate schedule can be adjusted as a function of other parameters, such as for example, the date and/or time of day that the triggered promotion is aired. As is known, prime-time and certain weekend slots have the highest viewership, and hence ostensibly would be most productive in generating viewer commitments via the triggers.

Referring now to FIG. 4, one embodiment of the method 400 of utilizing embedded triggers in a promotion is disclosed.

In a first step 402, a promotion is provided (such as by a subscriber network or studio) to the distributing entity (e.g., MSO or third party network entity). This may be a one-time promotion, may be aired on several occasions, or may be situationally or anecdotally created and/or run as previously described herein.

Next, per step 404, a trigger is selected and embedded within or associated with the promotion. For example, when a Cable Select trigger is embedded in a network promotion, the "select" icon 421 appears in the upper right corner (FIG. 4a). The placement of all of the Cable Select elements is in the illustrated embodiment designed to be minimally intrusive on the video and traditional placement of graphic elements. However, the attributes of the icons and display elements can be varied as desired, such as where a more intrusive presence is desired (e.g., where the user continually ignores the elements, the size, placement, etc. of the elements can be progressively scaled until a response is achieved, or some threshold is reached). Alternatively, separate windows (e.g., pop-ups or embedded "PIP" windows) can be used.

Next, by selecting the "select" icon 421, the viewer is given an option 422 to set a reminder, schedule the actual tuning to the program being promoted, or "subscribe" and get a reminder each time an episode of the series or set of events (or a related series) airs; see FIG. 4b. Using the arrow "left" and "right" functions 423 on, e.g. their wireless remote control unit, the viewer activates the option they desire and then selects it using function keys on the remote. In the illustrated embodiment, the trigger is present for the entire duration of the promotion, and can be activated at any time. Alternatively, the trigger (and icons or other audio/visual elements) can be selectively presented to the viewer at a prescribed point in the promotion, such as at the end.

It will also be recognized that the promotion presented to the user can be repeated, such as where the user did not catch the entire promotion, or they just could not make up their mind without seeing it again. The second or subsequent replays of the promotion may be identical, or alternatively may be changed (yet still embed the same trigger(s)) so as to address the user's questions regarding the first promotion, such as where the user desires more information about a particular facet of the promoted event before deciding. This functionality can be implemented with, e.g., a "replay promotion" button or menu selection, which can then be followed by a "same or different?" button or graphic, or the like. In another variant, the replayed promotion is merely an extended or more detailed version of the first promotion.

As shown in FIG. 4c, once a reminder or scheduling has been requested, the viewer is next optionally queried via the display 424 as to which of the household member's lists they wish to add this program (step 406). Each of these lists are further optionally linked to profiles created by the viewer in initial set-up of the Cable Select system. In one embodiment, the information present in these profiles is selectively passed (such as with viewer assent) back to the head-end, MSO or network in order to (i) provide the network or other entity with more detailed information on viewer demographics and habits, and (ii) allow the customized tailoring of subsequent promotions or even content according to that viewer's individual interests, age group, viewing habits, etc. The segmenting of lists in this fashion affords the viewer the ability to review and edit their own choices more effectively.

Once the program has been added to one or more lists, a summary of the activity is optionally presented along with the option to cancel the viewing appointment or reminder (step 408). The viewer can also select the "manage" function 425 to see a list of their scheduled programs (see FIG. 4d).

All reminders and scheduled viewings are recorded in a full screen file that is accessible from the MSO's main Electronic Program Guide (EPG) 427 or during individual tagged promotions (see FIG. 4e). The viewer may view their individual viewing schedules, those of other family members, or all of them combined. They can scroll through their choices, set up recurring viewings (season passes), modify or delete choices, and resolve any conflicts 429 between the various schedules.

As a scheduled programming event nears, the exemplary Cable Select embodiment informs the viewer that it is about to change the channel (step 410) via, e.g., an on-screen display 432. This is accomplished using graphics and/or audible elements which (i) tells the viewer(s) who scheduled the event, and what the event is, and (ii) provides a link to the list that the scheduled event is part of; see FIG. 4f. It also gives the viewer(s) the option of getting information on the selected event, and even canceling it or delaying the invocation of the tuning process (such as to watch the end of a late-running program, and then cut to the scheduled event late).

Figure 4G:
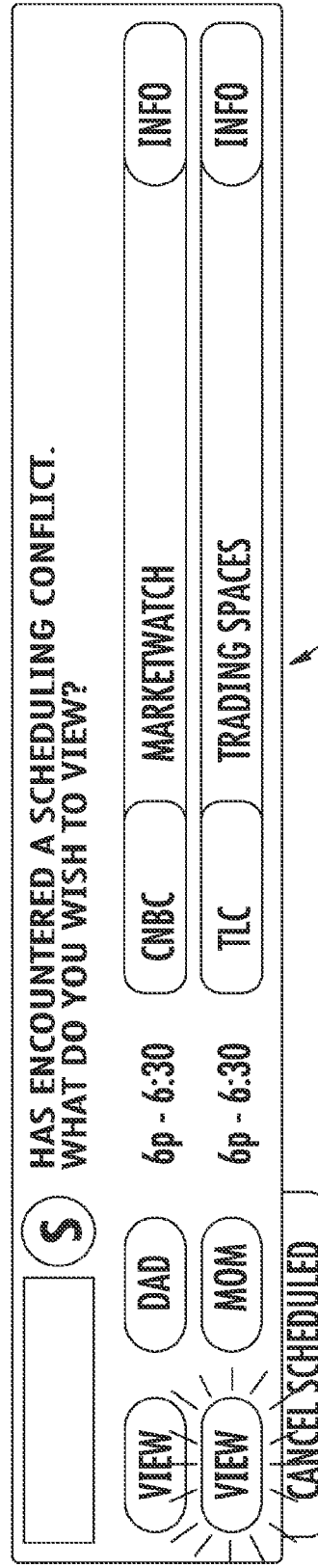
Figure 4H:
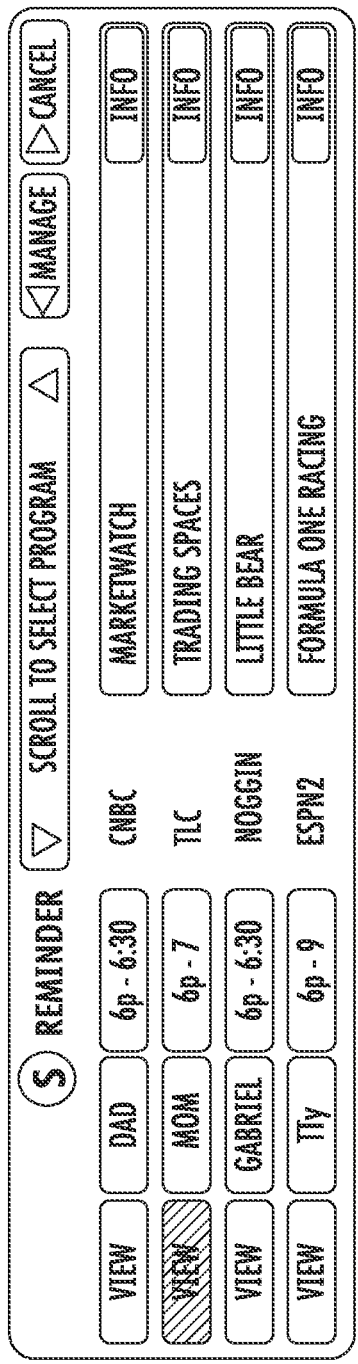
Figure 41:
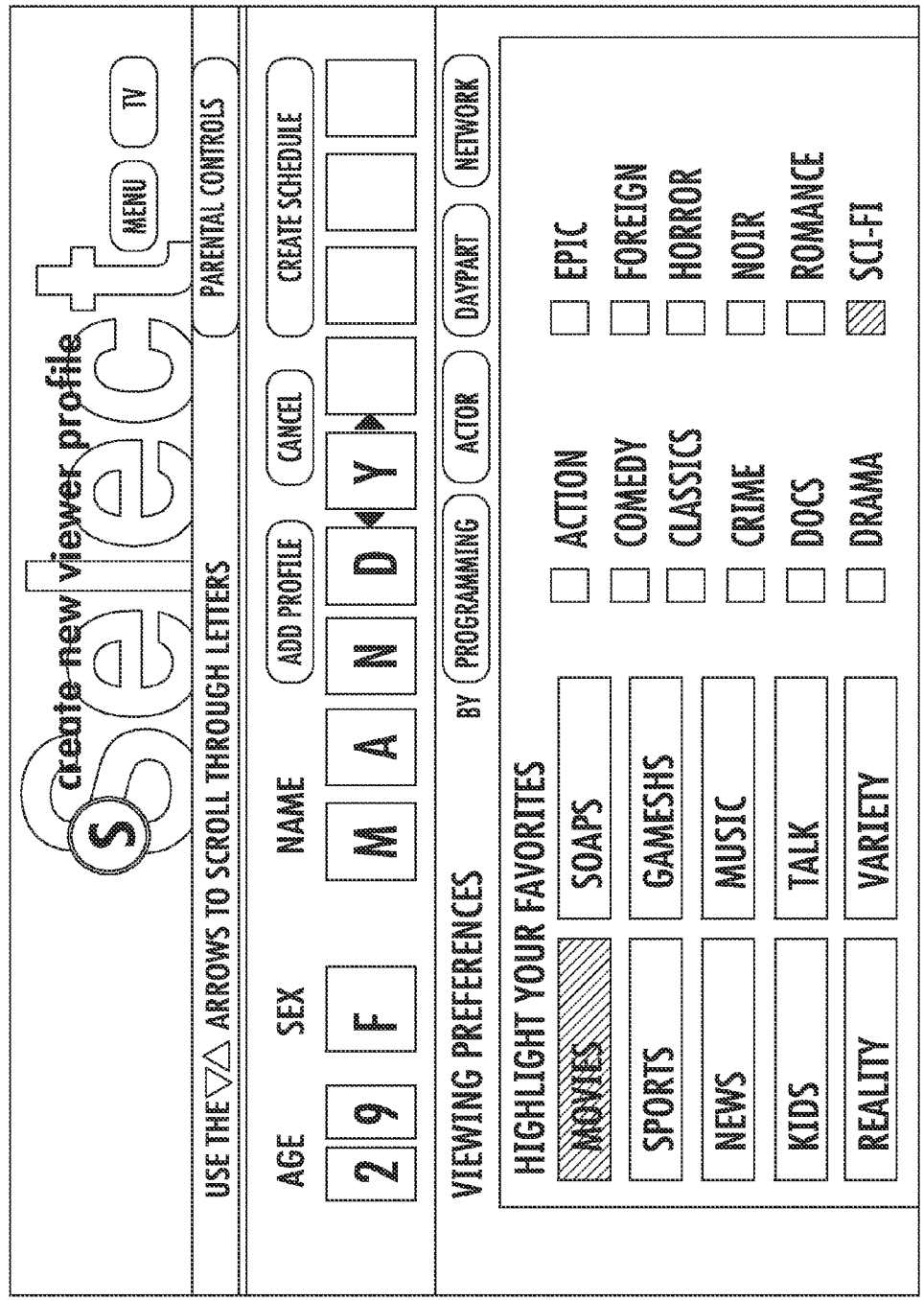

Per step 412, if a scheduling conflict has not been resolved by the time Cable Select is about to change the channel, choices for resolving the conflict are optionally given to the viewer via e.g., an on-screen display 434 (see FIG. 4g). If multiple reminders and/or scheduled viewings overlap, a menu 440 detailing the viewers choices is presented in adequate time for a selection (see FIG. 4h).

Lastly, per step 414, the event is then viewed at the appropriate time and date.

As shown in the example display 442 of FIG. 4i, each family member or viewer within the premises creates a viewer profile that identifies the type of programming they are interested in, which is tracked against their actual viewing choices. Specifically, even though a particular viewer (e.g., household member) "selects" an event for viewing or recording, it is not always a certainty that that event will be viewed or recorded, such as when it is over-ridden in a conflict situation. Hence, information relating to instances where a selected event (demonstrating a successful promotion transaction) is over-ridden, either by another selected event or simply canceled prior to viewing, is important. It may suggest or help identify, for example, programming scheduling conflicts that the network might not be aware of. These conflicts may relate to different audiences and/or different networks, yet at the same time of day.

Figure 4J:
Figure 4K:
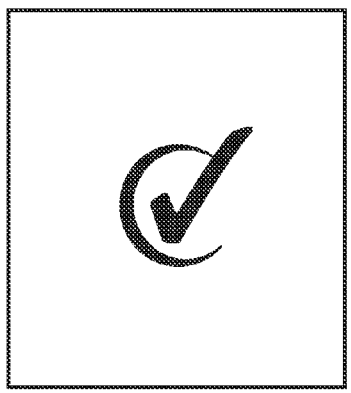
Figure 4L:
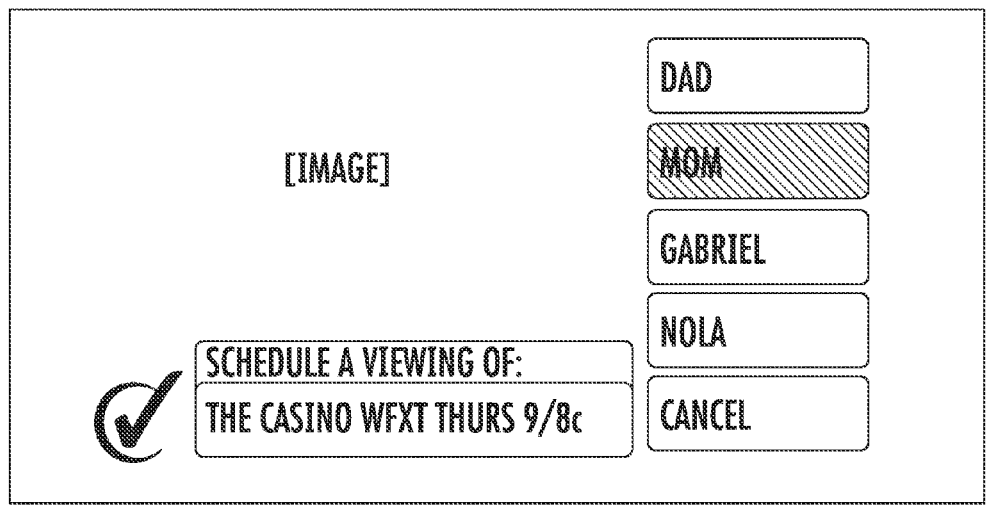
Figure 4M:
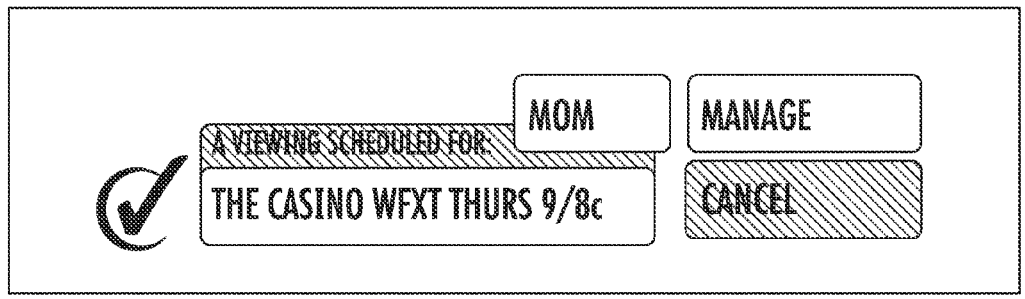
Figure 4N:
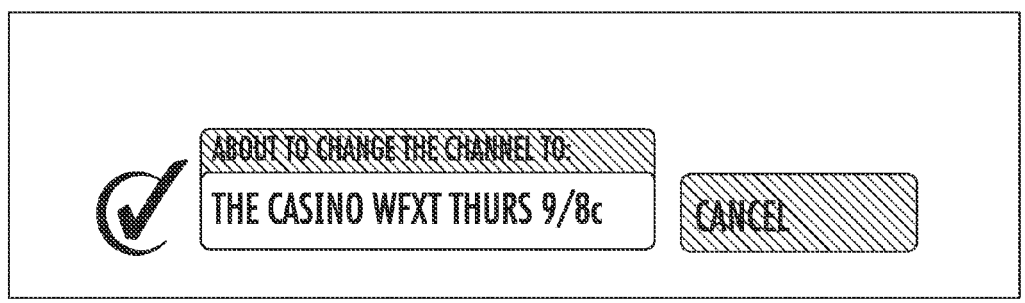
Figure 40:
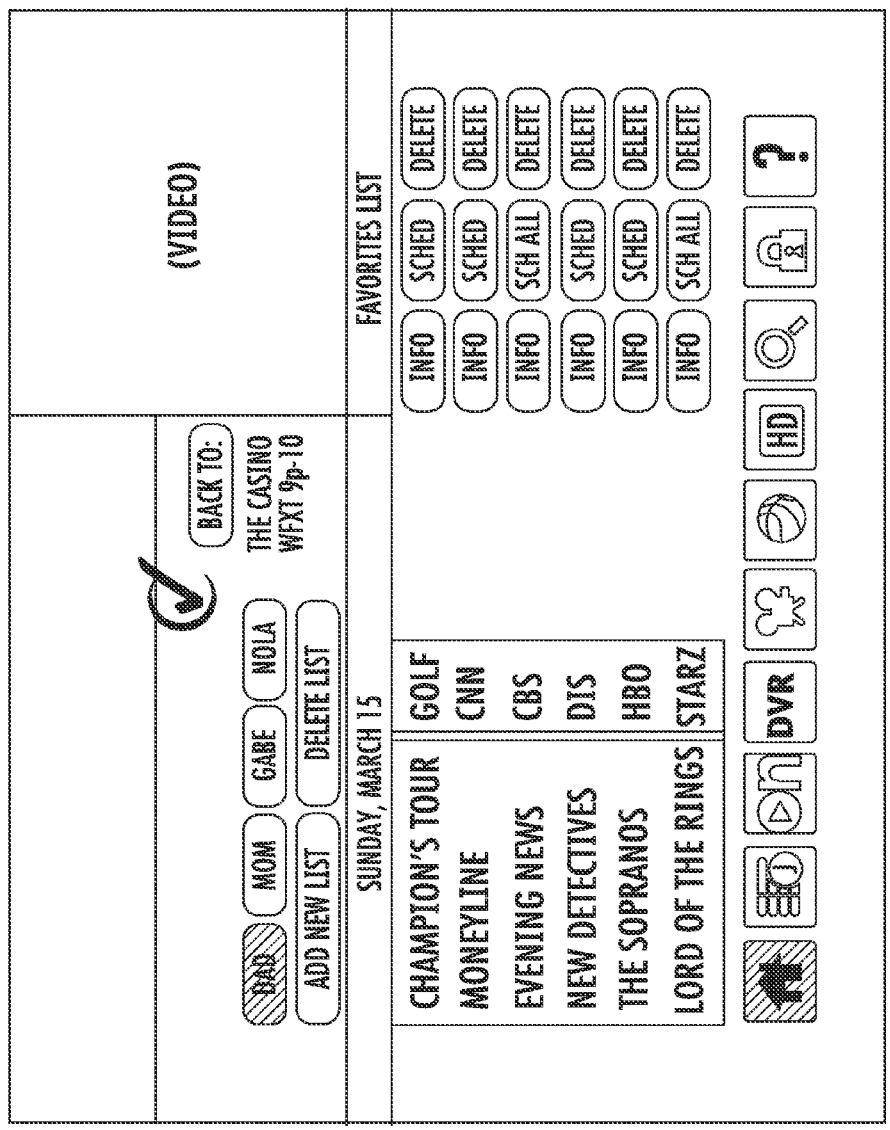
Figure 4P:
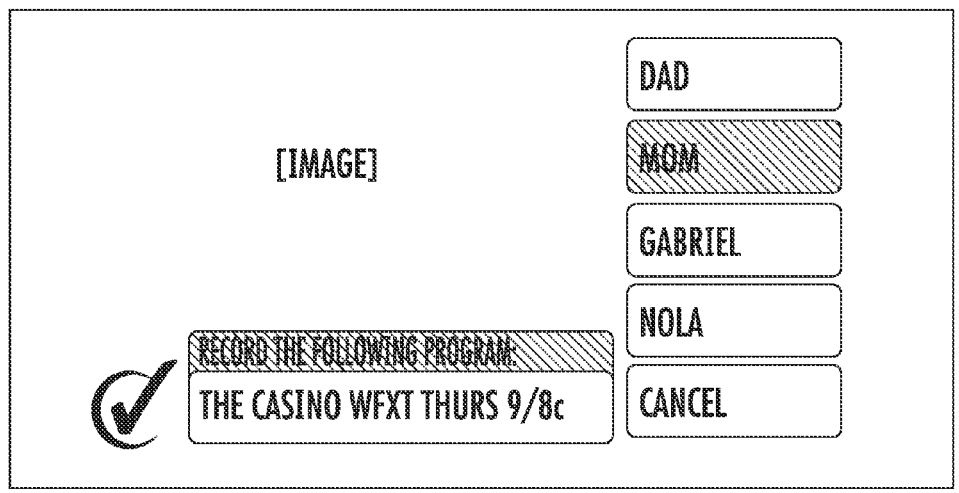

Furthermore, each network, MSO or other service "subscriber" is optionally provided an automated report for the events it promotes with triggered promotions via the Cable Select system (see FIG. 4j). These reports allow the subscribers to judge the relative effectiveness of, inter alia, various promotional concepts, placements, lengths, and saturation. They can also determine which events are creating conflicts in translating the desire to view to actual viewings. For example, where the statistics indicate that a certain scheduling pattern between two or more events is creating a high percentage of conflicts (translating to a lower commitment rate), the network/MSO can alter their schedule to reduce the conflicts.

In another variant of the method (FIGS. 4k-4p), the aforementioned reminders are eliminated, and only event scheduling is performed. All "selected" events airing at the same time enter a queue. Though the Cable Select system will notify the viewer that there is a conflict between the events, it will instead default to the most recently scheduled (selected) event, or alternatively according to some other predetermined logic (e.g., first event scheduled, events scheduled by a particular individual first, etc.). Under the "most recent event scheduled" configuration, significant competition for selection, such as between networks, will exist, since each will be constantly trying to trump selections of events associated with other networks as the events get closer to airing. In this alternate embodiment, however, all selected events are listed in a menu, and the viewer is free to choose from the various events in the queue. FIGS. 4k-4p illustrate graphic and functional elements associated with an alternate embodiment of the user interface as well.

FIG. 5 provides a graphical representation of an exemplary menu structure and logical flow associated with one embodiment of the invention. Portions of FIG. 5 are correlated to the various menu options and displays discussed herein with respect to FIGS. 4a-4j.

It is noted that many variations of the methods described above may be utilized consistent with the present invention. Specifically, certain steps are optional and may be performed or deleted as desired. Similarly, other steps (such as additional data sampling, processing, filtration, calibration, or mathematical analysis for example) may be added to the foregoing embodiments. Additionally, the order of performance of certain steps may be permuted, or performed in parallel (or series) if desired. Hence, the foregoing embodiments are merely illustrative of the broader methods of the invention disclosed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. In a content delivery network, a method of associating one or more content elements with a trigger element, comprising:
   providing at least one content element configured to transfer to a user over said information network to user computer premises equipment (CPE);
   providing at least one promotion, said at least one promotion being directly or indirectly related to said at least one content element;
   associating at least one trigger element with said at least one promotion, said at least one trigger element being configured to trigger said CPE to take a specified action relating to said content element;
   receiving from said CPE a selection of said at least one promotion;
   in response to receiving said selection, storing said at least one trigger element on at least one entity remote to said CPE, said storing comprising particularly associating said at least one trigger element to said CPE; and
   utilizing said stored trigger element particularly associated with said CPE to invoke said specified action at said CPE via said remote entity.

2. The method of claim 1, wherein said act of providing at least one content element comprises providing at least video and audio content adapted for transfer over a cable network.

3. The method of claim 2, wherein said act of providing at least one promotion comprises providing at least promotional video and audio content over said network.

4. The method of claim 3, wherein said act of associating comprises embedding said at least one trigger element within said promotional content as metadata, and said specified action comprises tuning to the channel of said event at a predetermined date and time.

5. The method of claim 4, wherein said at least one trigger element comprises a user-configurable trigger element.

6. The method of claim 1, further comprising when said user has selected two or more promotions associated with conflicting respective content elements, enabling at least one of said at least one content element be distributed to a second device in communication with said CPE.

7. The method of claim 1, wherein said at least one promotion is further associated with a plurality of data descriptive of one or more conditions useful in invoking said specified action at said content element.

8. The method of claim 7, wherein said one or more conditions useful in invoking said specified action at said content element comprise at least one of: a date, a start time, an end time, a channel.

9. The method of claim 7, wherein said act of invoking said specified action comprises utilizing said at least one trigger element and said plurality of data.

10. The method of claim 1, wherein providing said at least one promotion comprises providing a message from an email server associated with an MSO, and said invoking said specified action comprises scheduling a reminder.

11. The method of claim 10, wherein said at least one network entity is configured to store said at least portions of said data and, upon occurrence of said date and start time, cause said CPE to tune to said channel.

12. In a content delivery network, a method of scheduling viewing of a future event, comprising:
- providing at least one promotion, said at least one promotion providing information to a user regarding said future event;
- associating at least one trigger element with said at least one promotion, said at least one trigger element comprising first metadata specifying a future date and time, second metadata specifying an activate signal which when employed activates selectability of a selectable icon displayed as a part of said promotion, and third metadata specifying a deactivate signal for selectability of said selectable icon;
- receiving from a consumer premises equipment (CPE) a selection of said future event associated with said at least one promotion, said selection being accomplished via selection of said selectable icon during a period after said activate signal has been employed and before said deactivate signal has been employed;
- in response to receiving said selection, storing said at least one trigger element; and
- utilizing said metadata at said specified future date and time to invoke said CPE to tune to said future event, wherein said storing of said at least one trigger element is performed at an entity remote from said CPE, said remote entity causing said CPE to tune to said future event at the future date and time.

13. A method of associating one or more content elements with a trigger element, comprising:
- enabling a user to configure one or more aspects of a user-selectable trigger element disposed within a promotion, said promotion being directly or indirectly related to at least one content element;
- delivering said promotion to a user device, said user-selectable trigger element within said promotion being configured according to said one or more aspects and being further configured to cause said user device to take a specified action relating to said content element when selected;
- transmitting an activation signal to said user device, said activation signal causing said user-selectable trigger element to be made available for selection by said user;
- transmitting a deactivation signal to said user device, said deactivation signal causing said user-selectable trigger element to be made unavailable for selection by said user;
- within a time period between said transmission of said activation signal and said transmission of said deactivation signal, receiving from said user device a selection of said trigger element; and
- causing said trigger element to be stored at a remote entity in communication with said user device, said remote entity utilizing said stored trigger element to cause said user device to perform said specified action.

* * * * *